(12) United States Patent
Kodama

(10) Patent No.: US 9,345,051 B2
(45) Date of Patent: May 17, 2016

(54) TERMINAL, COMMUNICATION CIRCUIT AND COMMUNICATION METHOD

(71) Applicant: FUJITSU LIMITED, Kawasaki-shi, Kanagawa (JP)

(72) Inventor: Takeshi Kodama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 14/023,210

(22) Filed: Sep. 10, 2013

(65) Prior Publication Data

US 2014/0071893 A1   Mar. 13, 2014

(30) Foreign Application Priority Data

Sep. 11, 2012   (JP) .................................. 2012-199514

(51) Int. Cl.
*H04W 74/08* (2009.01)
*H04W 56/00* (2009.01)

(52) U.S. Cl.
CPC .......... *H04W 74/0858* (2013.01); *H04W 56/00* (2013.01); *H04W 74/085* (2013.01)

(58) Field of Classification Search
None
See application file for complete search history.

(56) References Cited

U.S. PATENT DOCUMENTS

| 6,594,240 | B1 | 7/2003 | Chuah et al. | |
|---|---|---|---|---|
| 2006/0063544 | A1* | 3/2006 | Zhao et al. | 455/510 |
| 2008/0070632 | A1 | 3/2008 | Obuchi et al. | |
| 2008/0076434 | A1 | 3/2008 | Shigaki et al. | |
| 2009/0257421 | A1* | 10/2009 | Nakashima et al. | 370/345 |
| 2010/0157796 | A1 | 6/2010 | Chin et al. | |
| 2011/0065437 | A1* | 3/2011 | Shimizu et al. | 455/436 |
| 2011/0090856 | A1* | 4/2011 | Cho et al. | 370/329 |

FOREIGN PATENT DOCUMENTS

| JP | 2000-209661 A | 7/2000 |
|---|---|---|
| JP | 2008-78891 A | 4/2008 |
| JP | 2008-79079 A | 4/2008 |
| JP | 2008-278050 A | 11/2008 |
| JP | 2009-272940 A | 11/2009 |
| JP | 4743910 B2 | 8/2011 |
| JP | 2012-513168 A | 6/2012 |
| WO | WO 2008/004629 A1 | 1/2008 |

OTHER PUBLICATIONS

Office Action of Japanese Patent Application No. 2012-199514 dated Mar. 22, 2016 with partial translation.

* cited by examiner

*Primary Examiner* — Timothy J Weidner
(74) *Attorney, Agent, or Firm* — Arent Fox LLP

(57) ABSTRACT

A terminal including: an antenna configured to transmit a first random access signal, when the terminal loses a synchronization with a base station, to the base station, and to transmit a second random access signal, when a response signal to the first random access signal is not received by the terminal, to the base station after a period, and a processor configured to obtain a detection result by detecting, when the terminal loses the synchronization with the base station, whether a communication is in progress or not, and to set the period based on the detection result.

14 Claims, 28 Drawing Sheets

FIG. 5

| PROTOCOL TYPE | IP ADDRESS OF COMMUNICATION DESTINATION | PORT NUMBER |
|---|---|---|
| TCP | 192.168.1.10 | 80 |

FIG. 6

| CONNECTION IDENTIFIER | COMMUNICATION DIRECTION | ToS | TRAFFIC PRIORITY |
|---|---|---|---|
| 1 | INBOUND | BEST EFFORT | STANDARD |
| 2 | OUTBOUND | BEST EFFORT | STANDARD |

FIG. 8

| FREQUENCY VALUE (GHz) |
|---|
| 2.50 |
| 2.51 |
| 2.52 |

FIG. 9

| SYNTAX | SIZE | DESCRIPTION |
| --- | --- | --- |
| UCD Message format { | | |
| Management Message Type | 8 BITS | NUMBER INDICATING THE TYPE OF MESSAGE. TYPE=0 INDICATES A UCD MESSAGE. |
| Configuration Change Count | 8 BITS | VALUE THAT INDICATES WHETHER THE CONTENTS OF THE UCD MESSAGE HAS BEEN CHANGED FROM THE PREVIOUS TRANSMISSION. IF THE CONTENTS AT THE PREVIOUS TRANSMISSION HAVE BEEN CHANGED, THE VALUE AT THE PREVIOUS TRANSMISSION IS INCREMENTED BY ONE. |
| Ranging Backoff Start | 8 BITS | MINIMUM BACK-OFF VALUE TAKEN WHEN AN INITIAL RANGING CODE IS RETRANSMITTED |
| Ranging Backoff Enc | 8 BITS | MAXIMUM BACK-OFF VALUE TAKEN WHEN AN INITIAL RANGING CODE IS RETRANSMITTED |
| Request Backoff Start | 8 BITS | MINIMUM BACK-OFF VALUE TAKEN WHEN A BAND REQUEST IS RETRANSMITTED |
| Request Backoff End | 8 BITS | MAXIMUM BACK-OFF VALUE TAKEN WHEN A BAND REQUEST IS RETRANSMITTED |
| TLV Encoded Information | VARIABLE | |
| ... | | |
| } | | |

FIG. 10

| SYNTAX | SIZE | DESCRIPTION |
|---|---|---|
| UL-MAP_IE () { | | |
| CID | 16 BITS | CONNECTION IDENTIFIER OF A CONNECTION TO WHICH THE FOLLOWING PARAMETERS ARE APPLIED. IN INITIAL RANGING, 0 IS SET. |
| UIUC | 4 BITS | VALUE INDICATING THE TYPE OF A PARAMETER THAT FOLLOWS. WHEN THE PARAMETER IS AN INITIAL RANGING PARAMETER, 12 IS SET. |
| OFDMA symbol offset | 8 BITS | OFFSET IN THE SYMBOL DIRECTION REGARDING THE POSITION, ON A FRAME, OF A CHANNEL ASSIGNED FOR RANGING CODE TRANSMISSION |
| Subchannel offset | 7 BITS | OFFSET IN THE SUB-CHANNEL DIRECTION REGARDING THE POSITION, ON A FRAME, OF A CHANNEL ASSIGNED FOR RANGING CODE TRANSMISSION |
| No. OFDMA Symbols | 7 BITS | NUMBER OF OFDMA SUB-CHANNLES USED IN RANGING CODE TRANSMISSION |
| No. subchannels | 7 BITS | MAXIMUM BACK-OFF VALUE TAKEN WHEN A BAND REQUEST IS RETRANSMITTED |
| Ranging method | 2 BITS | VALUE INDICATING THE TYPE OF RANGING PROCESSING. IN INITIAL RANGING CODE TRANSMISSION, THIS VALUE IS SET TO 0 OR 1. |
| Dedicated ranging indicator | 1 BIT | VALUE INDICATING A PURPOSE OF CHANNEL USE. IN INITIAL RANGING CODE TRANSMISSION, THIS VALUE IS SET TO 0. |
| ... | | |
| } | | |

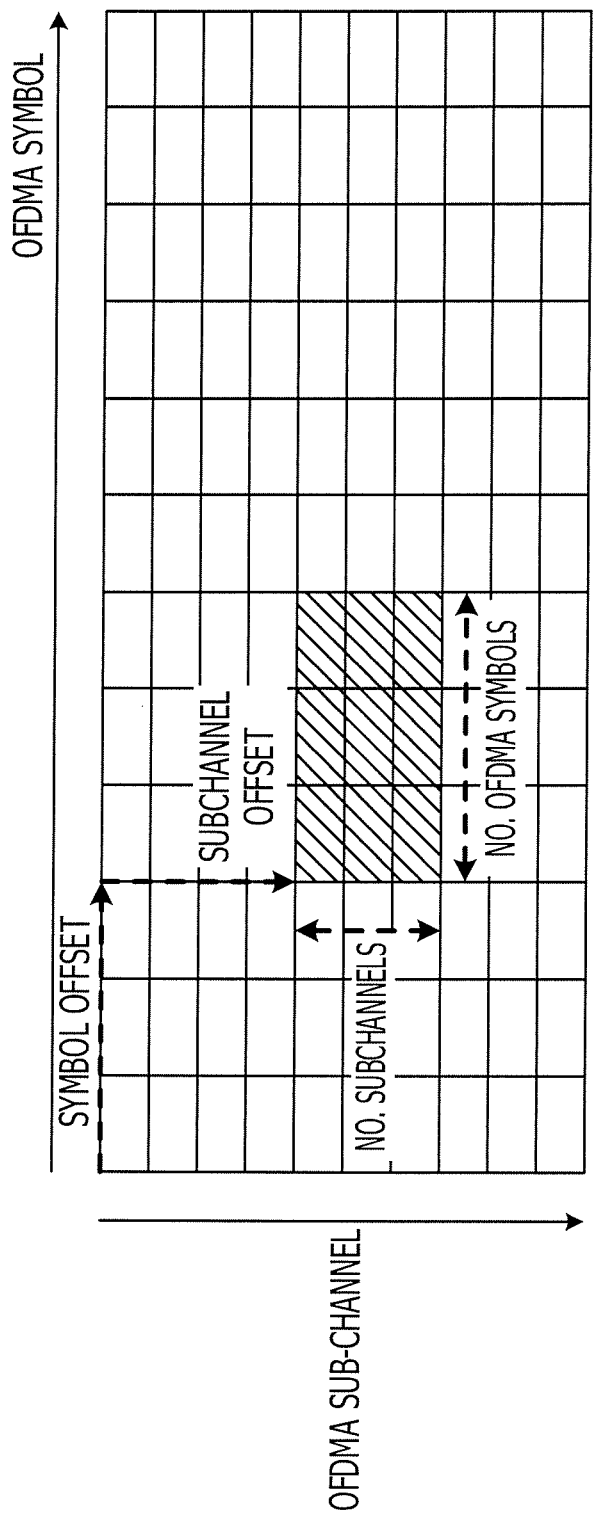

FIG. 14

| CYCLE<br>(NUMBER OF FRAMES) | OFFSET<br>(NUMBER OF FRAMES) | INTERMITTENT RECEPTION PERIOD<br>(NUMBER OF FRAMES) |
|---|---|---|
| 1000 | 64 | 5 |

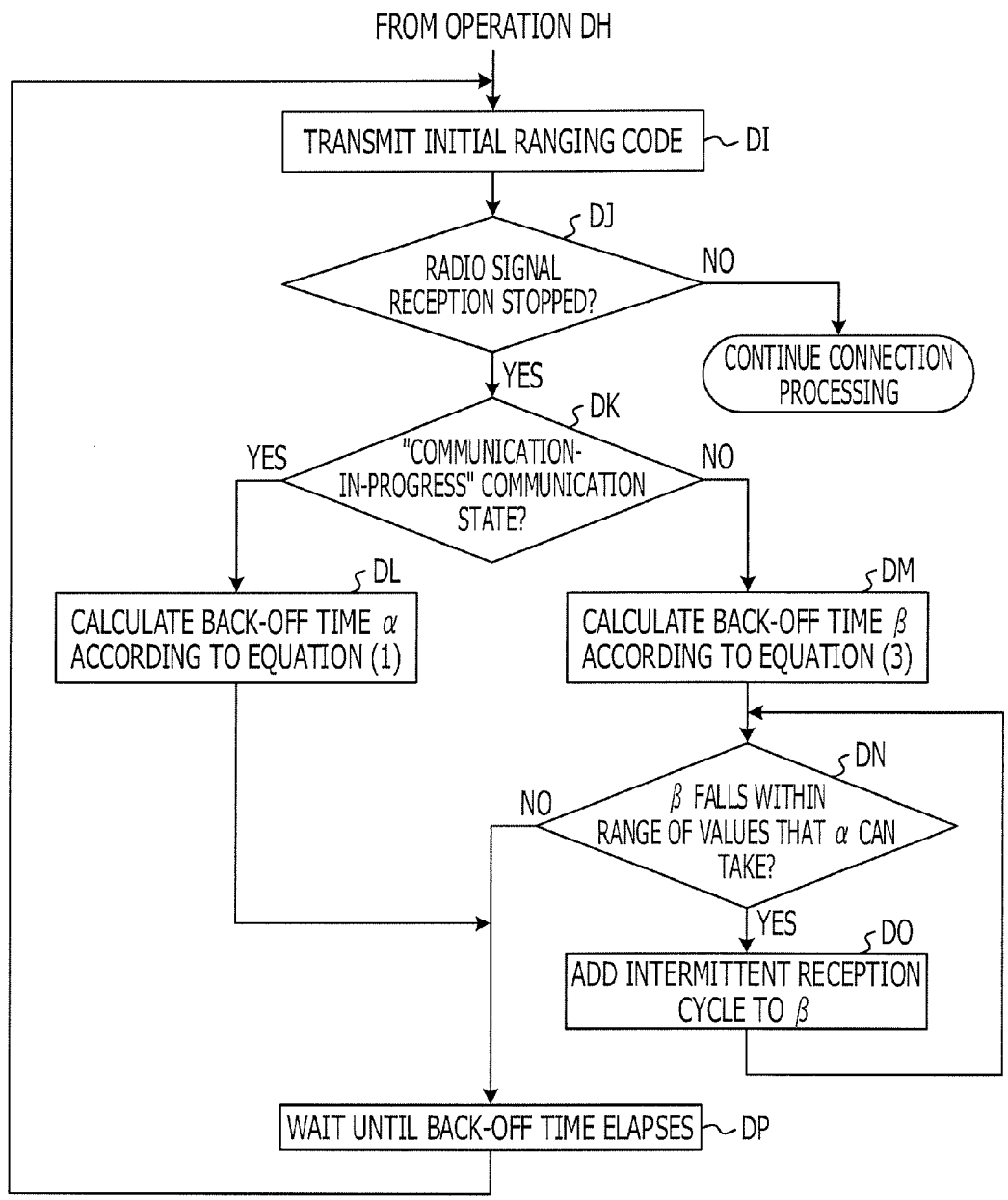

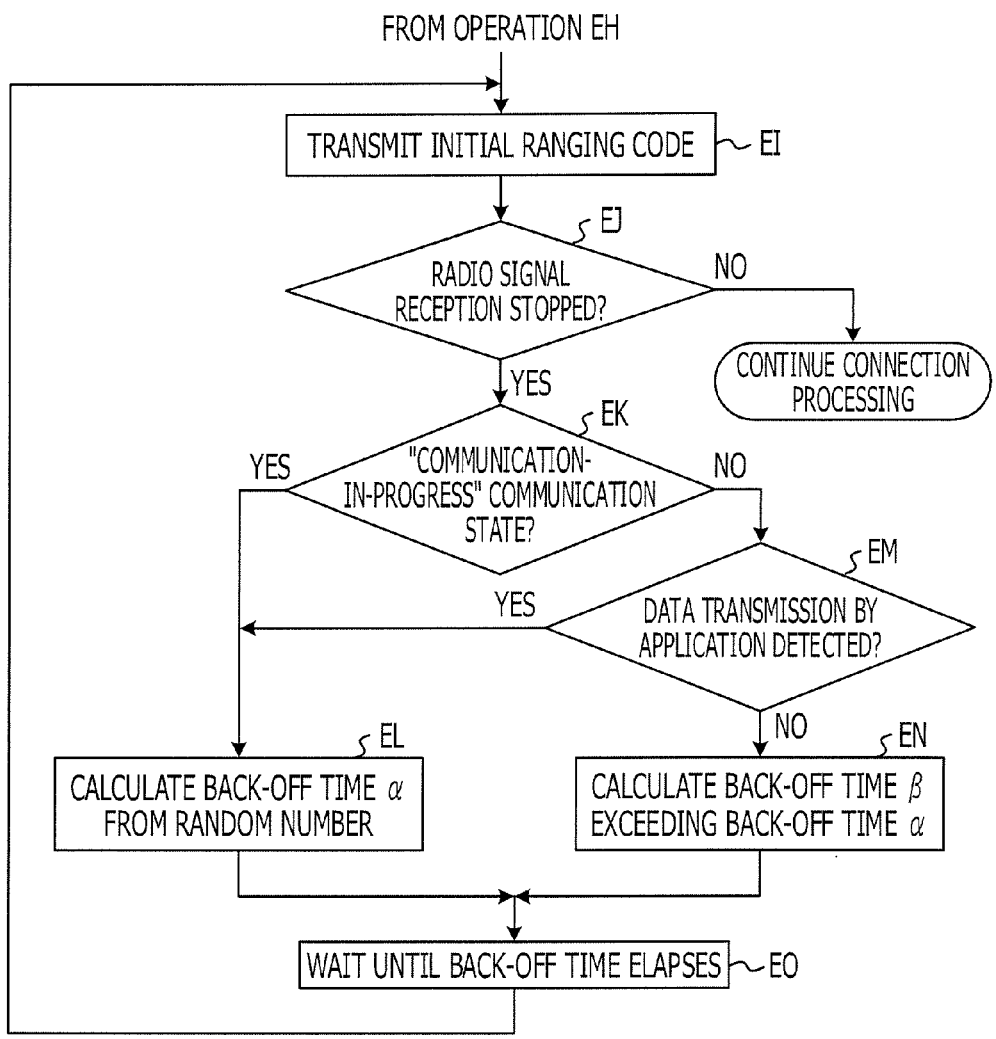

FIG. 20

| SYNTAX | SIZE | DESCRIPTION |
|---|---|---|
| RNG-RSP format { | | |
| Management Messge Type=5 | 8 BITS | NUMBER INDICATING THE TYPE OF MESSAGE. TYPE=5 INDICATES AN RNG-RSP MESSAGE. |
| Reserved | 8 BITS | RESERVED AREA |
| TLV Encoded Information | VARIABLE | |
| ... | | |
| } | | |

TERMINAL, COMMUNICATION CIRCUIT AND COMMUNICATION METHOD

CROSS-REFERENCE TO RELATED APPLICATION

This application is based upon and claims the benefit of priority from the prior Japanese Patent Application No. 2012-199514 filed on Sep. 11, 2012, the entire contents of which are incorporated herein by reference.

FIELD

Embodiments discussed herein are related to a terminal, a communication circuit and a communication method that are used in mobile communication.

BACKGROUND

When a mobile station apparatus (namely, terminal) located in an area covered by a base station apparatus starts communication in a wireless communication system, the mobile station apparatus uses a channel shared with other mobile station apparatuses to transmit a connection request to the base station apparatus at an arbitrary time. Here, the connection request corresponds to a random access signal. If a plurality of mobile station apparatuses concurrently transmit connection requests, the base station apparatus may discard these connection requests. In the descriptions below, concurrent signal transmission performed by a plurality of mobile station apparatuses may be referred to as "collision" of signals.

To avoid repetitive collisions of connection requests, it is known that after a collision occurs, the mobile station apparatus waits until a back-off time elapses before retransmitting a connection request. The back off time is calculated according to a random number generated in the relevant mobile station apparatus. Since different mobile station apparatuses perform retransmission at different times, the probability of repetitive collisions can be lowered. The method of retransmitting signals at random times is referred to as a random back-off method or random access method.

With a related technology, it is known that when a handover destination cell is found to be an area affected by electromagnetic interference (EMI), a reconnection time predetermined for a mobile terminal is changed. If the EMI-affected area is an out-of-coverage area where no cells are included, the predetermined reconnection time is shortened. If the EMI-affected area is an area that temporarily suffers from electromagnetic interference, the predetermined reconnection time is prolonged. If the EMI-affected area is a congested area, the predetermined reconnection time is shortened Japanese Laid-open Patent Publication No. 2008-79079 is an example of related art.

SUMMARY

According to an aspect of the invention, a terminal includes an antenna configured to transmit a first random access signal, when the terminal loses a synchronization with a base station, to the base station, and to transmit a second random access signal, when a response signal to the first random access signal is not received by the terminal, to the base station after a period, and a processor configured to obtain a detection result by detecting, when the terminal loses the synchronization with the base station, whether a communication is in progress or not, and to set the period based on the detection result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a first example of connection information;

FIG. 6 illustrates a second example of connection information;

FIG. 8 illustrates an example of contents stored in a frequency information storage unit;

FIG. 9 illustrates a UCD message format;

FIG. 10 illustrates an example of a UL-MAP IE format;

FIG. 11 illustrates channels used to transmit an initial ranging code;

FIG. 14 illustrates contents stored in an intermittent reception information storage unit;

FIG. 16B is another flowchart illustrating the fourth example of an operation by the mobile station apparatus;

FIG. 18B is another flowchart illustrating the fifth example of an operation by the mobile station apparatus;

FIG. 20 illustrates a format of the RNG-RSP message;

DESCRIPTION OF EMBODIMENTS

There are restrictions on the range of values that the back-off time can take and on wireless resources used to transmit connection requests, so even if a random back-off method is used, collisions of connection requests may be repeated. An object of the apparatus and method disclosed herein is to reduce repetitive collisions of connection requests.

1. First Embodiment 1.1 Structure of a Communication System

Figure 1:
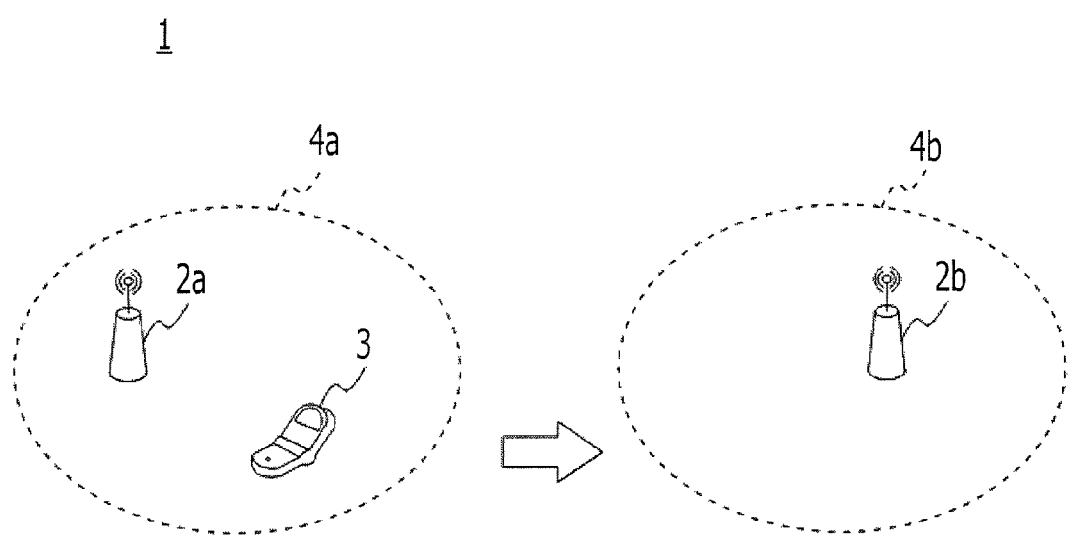
FIG. 1 illustrates an example of a layout of a communication system.

A preferred embodiment will be described with reference to the attached drawings. FIG. 1 illustrates an example of a layout of a communication system. The communication system 1 includes base station apparatuses 2a and 2b and a mobile station apparatus 3. In the description below and on the attached drawings, the base station apparatus and mobile station apparatus may be referred to as the base station and mobile station. The base station 2a and base station 2b may be collectively referred to as simply as the base station 2. The number of base stations 2 included in the communication system 1 is not limited to two. The communication system 1 may include three or more base stations 2. Similarly, the communication system 1 may include a plurality of mobile stations 3.

Communication areas of the base stations 2a and 2b are respectively denoted by reference characters 4a and 4b. Now, it is assumed that the frequency used by the base station 2a in wireless communication is 2.50 GHz and the frequency used by the base station 2b is 2.51 GHz. It is also assumed that the communication areas 4a and 4b do not overlapped each other, so when moving from the communication area 4a to the communication area 4b, the mobile station 3 temporarily goes out of a communication area and shifts to an out-of-coverage area.

1.2 Structure of the Mobile Station

Figure 2:
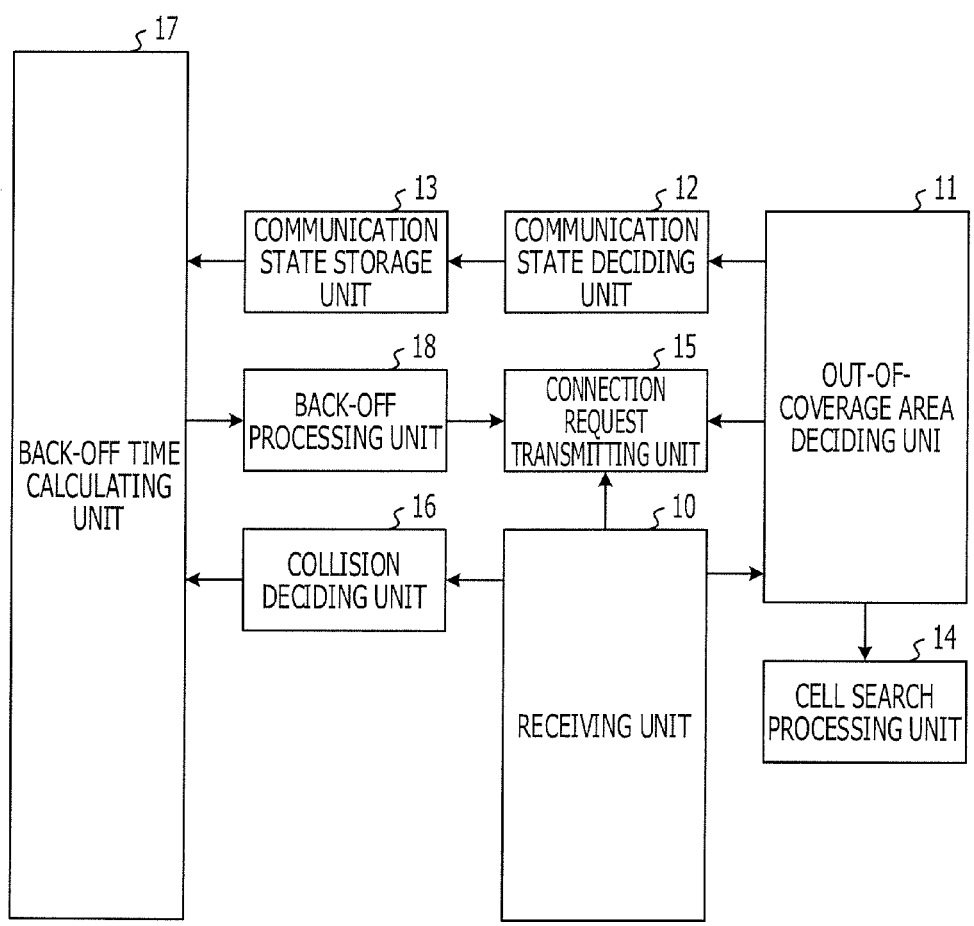
FIG. 2 illustrates the structure of a first embodiment of a mobile station apparatus.

Next, the structure of the mobile station 3 will be described. FIG. 2 illustrates the structure of a first embodiment of the mobile station 3. The mobile station 3 includes a receiving unit 10, an out-of-coverage area deciding unit 11, a communication state deciding unit 12, a communication state storage unit 13, a cell search processing unit 14, a connection request transmitting unit 15, a collision deciding unit 16, a back-off time calculating unit 17, and a back-off processing unit 18.

The receiving unit 10 receives a wireless signal from the base station 2, after which the receiving unit 10 modules and decodes the received wireless signal to convert it to the original message. The out-of-coverage area deciding unit 11 decides whether the mobile station 3 has moved to an area other than the communication area covered by the base station 2, that is, whether the mobile station 3 is in an out-of-coverage area, depending on whether the mobile station 3 has received no more radio signals from the base station 2.

If the out-of-coverage area deciding unit 11 decides that the mobile station 3 is in an out-of-coverage area, the communication state deciding unit 12 then decides whether the communication state of the mobile station 3 immediately before it has shifted to the out-of-coverage area was "communication-in-progress" or "standby" in which data transmission or reception has not been in progress. A decision result made by the communication state deciding unit 12 is stored in the communication state storage unit 13.

After the out-of-coverage area deciding unit 11 has decided that the mobile station 3 is in an out-of-coverage area, the cell search processing unit 14 performs cell search processing to search for a base station 2 located around the mobile station 3. The connection request transmitting unit 15 transmits a connection request to the base station 2 searched for by the cell search processing unit 14. The collision deciding unit 16 decides whether the connection request transmitted to the base station 2 has caused a collision with a connection request transmitted from another mobile station.

If the collision deciding unit 16 decides that a connection request collision has been caused, the back-off time calculating unit 17 calculates a back-off time, which differs depending on the communication state of the mobile station 3 immediately before it has shifted to the out-of-coverage area. In the descriptions below, the back-off time taken when the communication state of the mobile station 3 immediately before it has shifted to the out-of-coverage area was "communication-in-progress" will be referred to as the back-off time α, and the back-off time taken when the communication state of the mobile station 3 immediately before it has shifted to the out-of-coverage area was "standby" will be referred to as the back-off time β.

The back-off time calculating unit 17 calculates the back-off time α and back-off time β so that the back-off time β exceeds the back-off time α. For example, the back-off time calculating unit 17 may calculate the back-off time α according to a random number generated for each mobile station 3. In this case, the back-off time calculating unit 17 may calculate the back-off time β according to a deciding method in which any value exceeding the range of values that the back-off time α can take is selected.

The back-off processing unit 18 delays connection request retransmission by the connection request transmitting unit 15 until the back-off time calculated by the back-off time calculating unit 17 elapses.

1.3 Operation by the Mobile Station

Figure 3A:
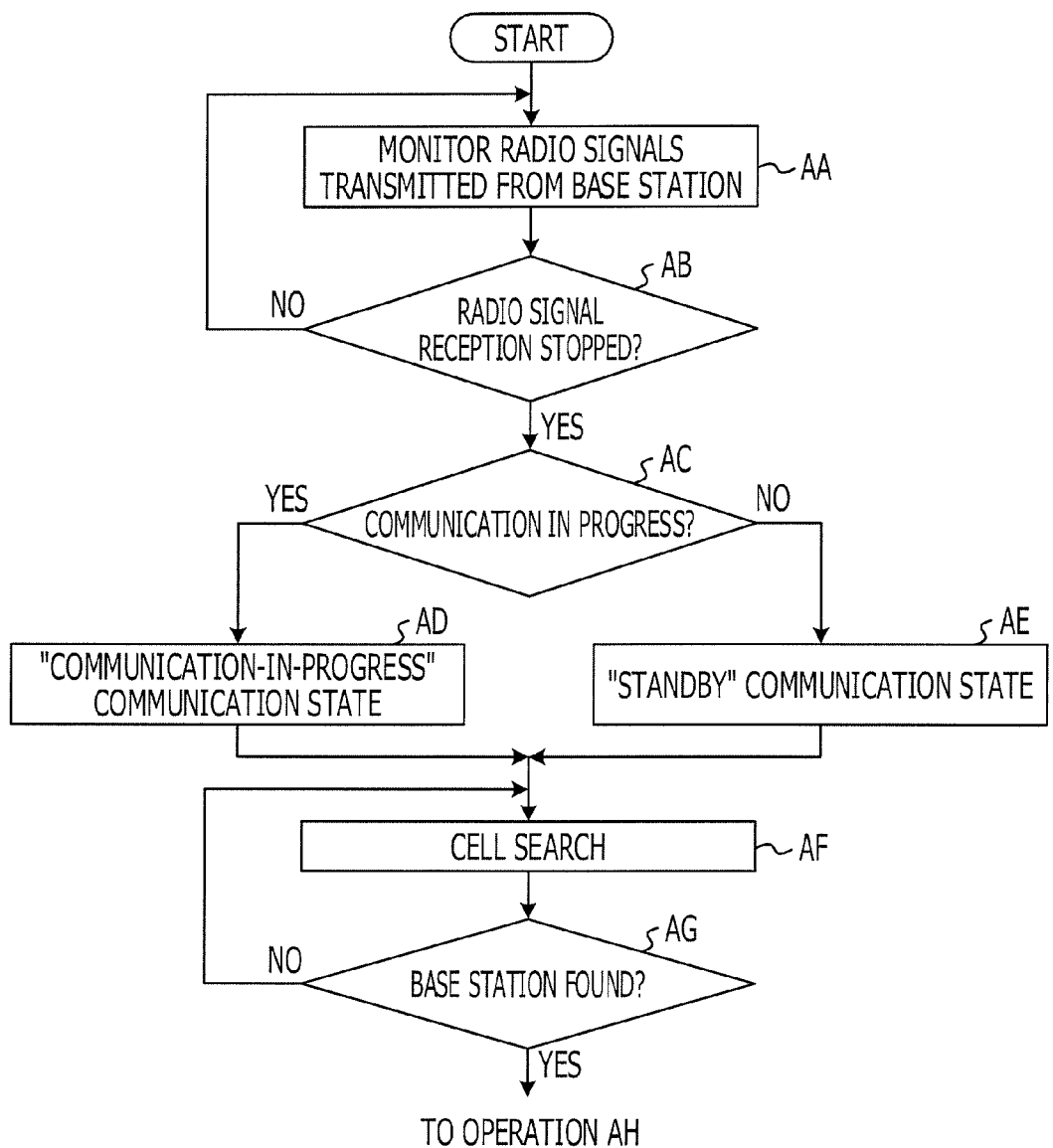
FIG. 3A is a flowchart illustrating a first example of an operation by the mobile station apparatus.
Figure 3B:
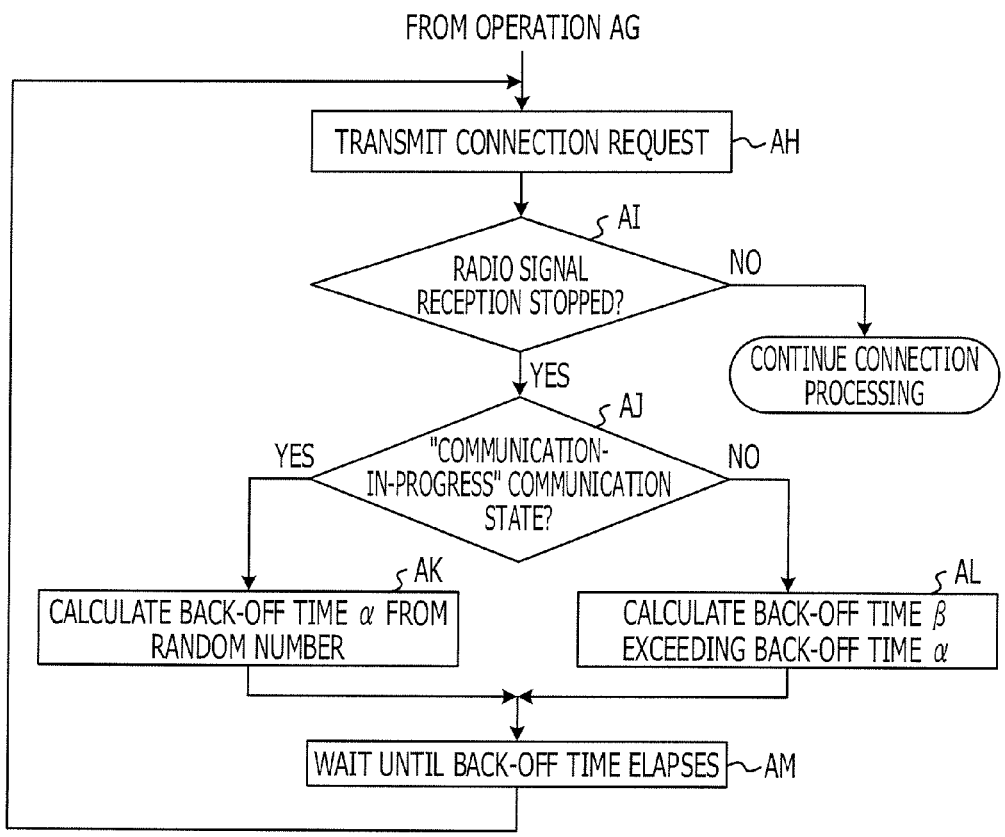
FIG. 3B is another flowchart illustrating the first example of an operation by the mobile station apparatus.

Next, an operation by the mobile station 3 will be described. FIGS. 3A and 3B are each a flowchart illustrating a first example of an operation by the mobile station 3. In operation AA, the out-of-coverage area deciding unit 11 monitors radio signals transmitted from the base station 2. In operation AB, the out-of-coverage area deciding unit 11 decides whether no more radio signals have been received from the base station 2.

If radio signal reception from the base station 2 has stopped (the result in operation AB is Y), the sequence proceeds to operation AC. If radio signal can be received from the base station 2 (the result in operation AB is N), the sequence returns to operation AA.

In operation AC, the communication state deciding unit 12 decides whether the communication state of the mobile station 3 immediately before it has shifted to the out-of-coverage area was "communication-in-progress" (the result in operation AC is Y), the sequence proceeds to operation AD. If the communication state was not "communication-in-progress" (the result in operation AC is N), the sequence proceeds to operation AE.

In operation AD, the communication-in-progress communication state is stored in the communication state storage unit 13 as the communication state of the mobile station 3 immediately before it has shifted to the out-of-coverage area. The sequence then proceeds to operation AF. In operation AE, the standby communication state is stored in the communication state storage unit 13 as the communication state of the mobile station 3 immediately before it has shifted to the out-of-coverage area. The sequence then proceeds to operation AF.

In operation AF, the cell search processing unit 14 performs cell search processing. In operation AG, the cell search processing unit 14 decides whether a base station 2 has been found around the mobile station 3. If a base station 2 has been found (the result in operation AG is Y), the sequence proceeds to operation AH. If a base station 2 has not been found (the result in operation AG is N), the sequence returns to operation AF.

In operation AH, the connection request transmitting unit 15 transmits a connection request to the base station 2 that has been found. In operation AI, the collision deciding unit 16 decides whether the connection request transmitted to the base station 2 has caused a collision with a connection request transmitted from another mobile station. If no connection request collision has been caused (the result in operation AI is N), the connection processing is continued. If a connection request collision has been caused (the result in operation AI is Y), the sequence proceeds to operation AJ.

In operation AJ, the back-off time calculating unit 17 decides whether the communication state of the mobile station 3 immediately before it has shifted to the out-of-coverage area was "communication-in-progress". If the communication state was "communication-in-progress" (the result in operation AJ is Y), the sequence proceeds to operation AK. If the communication state was not "communication-in-progress" (the result in operation AJ is N), the sequence proceeds to operation AL.

In operation AK, the back-off time calculating unit 17 calculates the back-off time α according to a random number. The sequence then proceeds to operation AM. In operation AL, the back-off time calculating unit 17 calculates the back-off time β so that it exceeds the range of values that the back-off time α can take. The sequence then proceeds to operation AM.

In operation AM, the back-off processing unit 18 waits until the back-off time calculated in one of operations AK and AL elapses. The sequence then returns to operation AH.

1.4 Advantageous Effects

In this embodiment, the range of the back-off time to be used can be changed depending on whether the communication state of the mobile station 3 immediately before it has shifted to an out-of-coverage area was "communication-in-progress". Therefore, it is possible to reduce re-collisions between a connection request transmitted from the mobile station 3 that was in the communication-in-progress communication state immediately before the mobile station 3 has shifted to the out-of-coverage area and connection requests transmitted from other mobile stations. As a result, repetitive connection request collisions can be reduced.

The communication system 1 may be restricted, for example, as described below. If many mobile stations 3 concurrently start communication under these restrictions, a connection collision easily occur.

(1) The range of values that the back-off time can take is narrowed so that a communication delay is not prolonged due to a too long back-off time.

(2) The number of assignable common channels used for connection request transmission is restricted to conserve resources.

In a situation in which, for example, a vehicle including many users who each have a mobile station 3 has exited a tunnel, many mobile stations 3 may concurrently start communication. In this embodiment, however, a mobile station 3 that was in the "communication-in-progress" communication state immediately before the mobile station 3 has shifted to an out-of-coverage area and other mobile stations retransmit connection requests at different times, so times to retransmit connection requests are decentralized, reducing repetitive collisions.

Furthermore, in this embodiment, the back-off time α of a mobile station 3 that was in the communication-in-progress communication state immediately before the mobile station 3 has shifted to an out-of-coverage area can be made shorter than the back-off time β of a mobile station 3 that was in the standby communication state immediately before the mobile station 3 has shifted to the out-of-coverage area.

From the standpoint of users, as for a time taken by the mobile station 3 to start communication with the base station 2, requirements (1) and (2) described below are preferably satisfied.

(1) If the mobile station 3 shifts to an out-of-coverage area while the mobile station 3 is communicating, the mobile station 3 preferably restarts the communication in a short time.

(2) If the mobile station 3 shifts to an out-of-coverage area while in a standby communication state in which the mobile station 3 was not communicating, a certain time may elapse before the mobile station 3 restarts communication.

In this embodiment, the back-off time α of a mobile station 3 that was in the communication-in-progress communication state immediately before the mobile station 3 has shifted to an out-of-coverage area is made shorter than the back-off time β of a mobile station 3 that was in the standby communication state, so a period taken until communication is restarted is shortened. As a result, the above requirements (1) and (2) for users are satisfied.

2. Second Embodiment

Next, another embodiment of the communication system 1 will be described. In the following descriptions of second to sixth embodiments, examples in which the communication system 1 is a system complying with Worldwide Interoperability for the Microwave Access (WiMAX) standard are taken. If, however, the communication system 1 uses a random back-off method as a method of reducing the probability of a connection request collision, the communication system 1 may be a system complying with a standard other than WiMAX. The communication system 1 may be, for example, a system complying with the Wideband Code Division Multiple Access (W-CDMA) or Long Term Evolution (LTE) standard.

2.1 Structure of the Mobile Station

Figure 4:
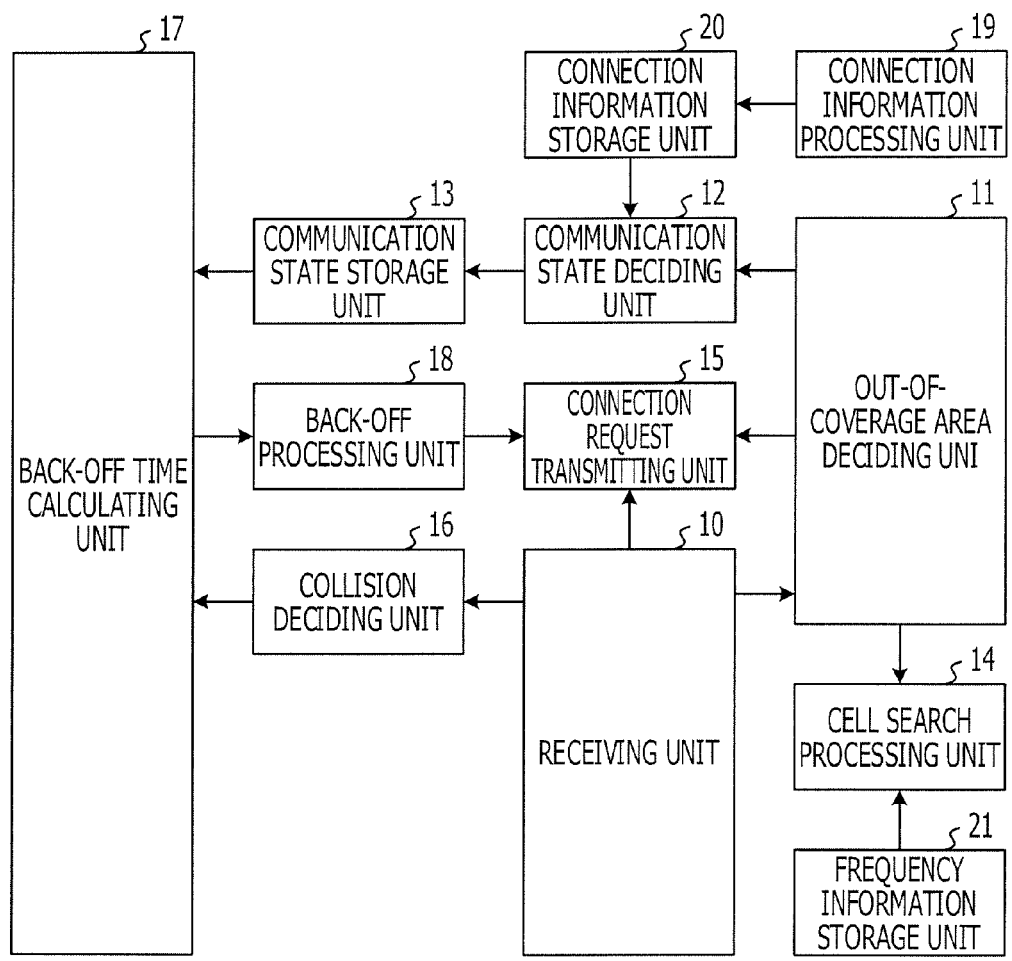
FIG. 4 illustrates the structure of a second embodiment of the mobile station apparatus.

FIG. 4 illustrates the structure of a second embodiment of the mobile station 3 in the second embodiment. Constituent elements that are the same as constituent elements in FIG. 2 will be given the same reference numerals as the reference numerals used in FIG. 2, and descriptions for the same functions will be omitted. The mobile station 3 includes a connection information processing unit 19, a connection information storage unit 20, and a frequency information storage unit 21.

The out-of-coverage area deciding unit 11 decides whether the mobile station 3 has moved to an area other than the communication area covered by the base station 2, that is, whether the mobile station 3 is in an out-of-coverage area. If, for example, a state in which a downlink map (DL-MAP) message, which is downlink wireless resource allocation information, fails to be obtained from the receiving unit 10 has continued for a certain time, the out-of-coverage area deciding unit 11 may decide that the mobile station 3 is in an out-of-coverage area. If a DL-MAP message can be obtained, the out-of-coverage area deciding unit 11 decides that the mobile station 3 is in a coverage area.

If the out-of-coverage area deciding unit 11 decides that the mobile station 3 is in an out-of-coverage area, the communication state deciding unit 12 then decides whether the communication state of the mobile station 3 immediately before it has shifted to the out-of-coverage area was "communicationin-progress". For example, if at least one piece of connection information is stored in the connection information storage unit 20, the communication state deciding unit 12 decides that the communication state was communication-in-progress. If no connection information is stored in the connection information storage unit 20, the communication state deciding unit 12 decides that the communication state was "standby".

The connection information stored in the connection information storage unit 20 may be information related to an end-to-end connection, connection information at the level of a link established between the mobile station and the base station, or their combination. FIG. 5 illustrates an example of connection information related to an end-to-end connection. This type of connection information may include a protocol type, the IP address of a communication destination, the port number of the communication destination, and other information.

FIG. 6 illustrates an example of link-level connection information. This type of connection information may include, for example, a connection identifier, a communication direction that identifies an inbound link or an outbound link, a type of service (ToS), a traffic priority, and other information.

The connection information processing unit 19 monitors a protocol used to create and delete a connection in order to store connection information in the connection information storage unit 20 and delete connection information from the connection information storage unit 20. When connection information is, for example, end-to-end connection information, the connection information processing unit 19 may store connection information at the time of three-way handshaking in Transmission Control Protocol (TCP).

When connection information is link-level connection information, the connection information processing unit 19 may store connection information at the time of transmission and reception of a dynamic service addition request (DSA-REQ) message and a dynamic service addition response (DSA-RSP) message.

In an embodiment of another communication system in which when the mobile station 3 is not communicating, it shifts to a state in which power consumption is reduced as in, for example, an idle mode, the communication state deciding unit 12 may decide whether the mobile station 3 is communicating depending on its state.

Figure 7A:
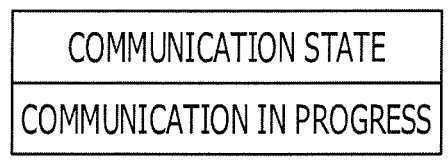
FIGS. 7A and 7B illustrate contents stored in a communication state storage unit.
Figure 7B:
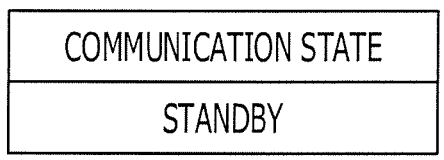

A decision result made by the communication state deciding unit 12 is stored in the communication state storage unit 13. FIGS. 7A and 7B illustrate contents stored in the communication state storage unit 13. If the communication state of the mobile station 3 immediately before it has shifted to the out-of-coverage area was "communication-in-progress", information indicating "communication in progress" is stored in the communication state storage unit 13, as illustrated in FIG. 7A. If the communication state of the mobile station 3 immediately before it has shifted to the out-of-coverage area was "standby", information indicating "standby" is stored in the communication state storage unit 13, as illustrated in FIG. 7B.

Figure 8:
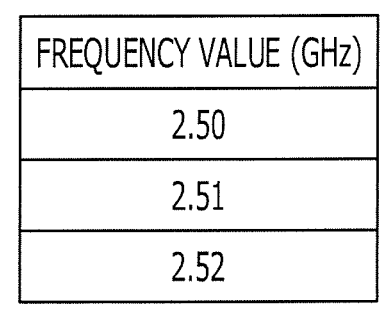

After the out-of-coverage area deciding unit 11 has decided that the mobile station 3 is in an out-of-coverage area, the cell search processing unit 14 searches for a base station 2 located around the mobile station 3. For example, the cell search processing unit 14 reads out frequency information, about wireless signals used by the base station 2, which is stored in the frequency information storage unit 21. Frequencies usable to the base station 2, which have been assigned to the communication carrier in advance, are stored in the frequency information storage unit 21. FIG. 8 illustrates an example of contents stored in the frequency information storage unit 21. In this example, frequency information items indicating 2.50 GHz, 2.51 GHz, and 2.52 GHz usable to the base station 2 are stored in the frequency information storage unit 21.

These frequency information items may be written to the frequency information storage unit 21 at a factory. The cell search processing unit 14 switches the frequency used by the mobile station 3 among these frequencies and tries to capture a wireless signal from the base station 2. This operation is repeated with different frequencies until the receiving unit 10 can decode a DL-MAP message from the wireless signal and the out-of-coverage area deciding unit 11 decides that the mobile station 3 is in a coverage area.

If the out-of-coverage area deciding unit 11 decides that the mobile station 3 is in a coverage area, the connection request transmitting unit 15 transmits a connection request to the base station 2. For example, the connection request transmitting unit 15 transmits an initial ranging code as the connection request. The range of values that the initial ranging code can take is specified by Initial Ranging Codes TLV included in an uplink channel descriptor (UCD) message. FIG. 9 indicates a UCD message format.

Initial Ranging Codes TLV is stored in the UCD message as a type of TLV encoded information. The connection request transmitting unit 15 selects a value included in the range specified by Initial Ranging Codes TLV as the initial ranging code.

A channel used to transmit the initial ranging code is specified by up-link map information element (UL-MAP IE) stored in an UL-MAP message. FIG. 10 indicates an example of a UL-MAP IE format.

If 12 is specified as a value in the UIUC field, the UL-MAP IE includes OFDMA symbol offset, Subchannel Offset, No. OFDMA Symbols, and No. Subchannels parameters. FIG. 11 illustrates channels used to transmit the initial ranging code specified by the UL-MAP IE.

An offset, in a symbol direction, of a channel used for initial ranging code transmission is specified by the OFDMA symbol offset parameter, and an offset, in a sub-channel direction, of the channel used for initial ranging code transmission is specified by the Subchannel offset parameter. The number of orthogonal frequency division multiple access (OFDMA) symbols for the channel used for initial ranging code transmission is specified by the No. OFDMA Symbols parameter, and the number of OFDMA sub-channels for the channel used for initial ranging code transmission is specified by the No. Subchannels parameter.

The collision deciding unit 16 decides whether the connection request transmitted to the base station 2 has caused a collision with a connection request transmitted from another mobile station. If, for example, a ranging response (RNG-RSP) message has not been received from the receiving unit 10 within a certain period of time of initial ranging code transmission, the collision deciding unit 16 decides that a collision has occurred. The RNG-RSP is a response message transmitted from the base station 2 in response to the initial ranging code.

In another embodiment, the mobile station 3 may receive all RNG-RSP messages transmitted from the base station 2, regardless of whether their destinations is the mobile station 3 or other mobile stations. If the mobile station 3 receives an RNG-RSP message destined for another mobile station apparatus for the channel that the mobile station 3 has used for initial ranging code transmission, the collision deciding unit 16 may decide that a collision has occurred before the above certain period of time elapses. The method of deciding the RNG-RSP message destination will be described in a sixth embodiment described later.

If the collision deciding unit 16 decides that an initial ranging code collision has occurred, the back-off time calculating unit 17 calculates a back-off time taken until an initial ranging code is retransmitted. Specifically, the back-off time calculating unit 17 reads out, from the communication state storage unit 13, the communication state of the mobile station 3 immediately before it has shifted to the out-of-coverage area, and calculates the back-off time α or back-off time β depending on the communication state.

If the communication state of the mobile station 3 immediately before it has shifted to the out-of-coverage area was "communication in progress", the back-off time calculating unit 17 calculates the back-off time α according to a random number. For example, the back-off time calculating unit 17 calculates the back-off time α according to equation (1) below.

$$\alpha \text{ (milliseconds)} = \text{integer from 1 to 99 that has been generated at random} \times 10 \quad (1)$$

If the communication state of the mobile station 3 immediately before it has shifted to the out-of-coverage area was "standby", the back-off time calculating unit 17 calculates the back-off time β according to an equation that yields a value exceeding the range of values that the back-off time α can take. For example, the back-off time calculating unit 17 calculates the back-off time β according to equation (2) below.

$$\beta \text{ (milliseconds)} = (\text{integer from 1 to 99 that has been generated at random} + 100) \times 10 \quad (2)$$

The back-off processing unit 18 delays connection request retransmission by the connection request transmitting unit 15 until the back-off time α or back-off time β, which is selected depending on whether the communication state of the mobile station 3 immediately before it has shifted to the out-of-coverage area was "communication in progress" or "standby", elapses.

2.2 Operation by the Mobile Station

Figure 12A:
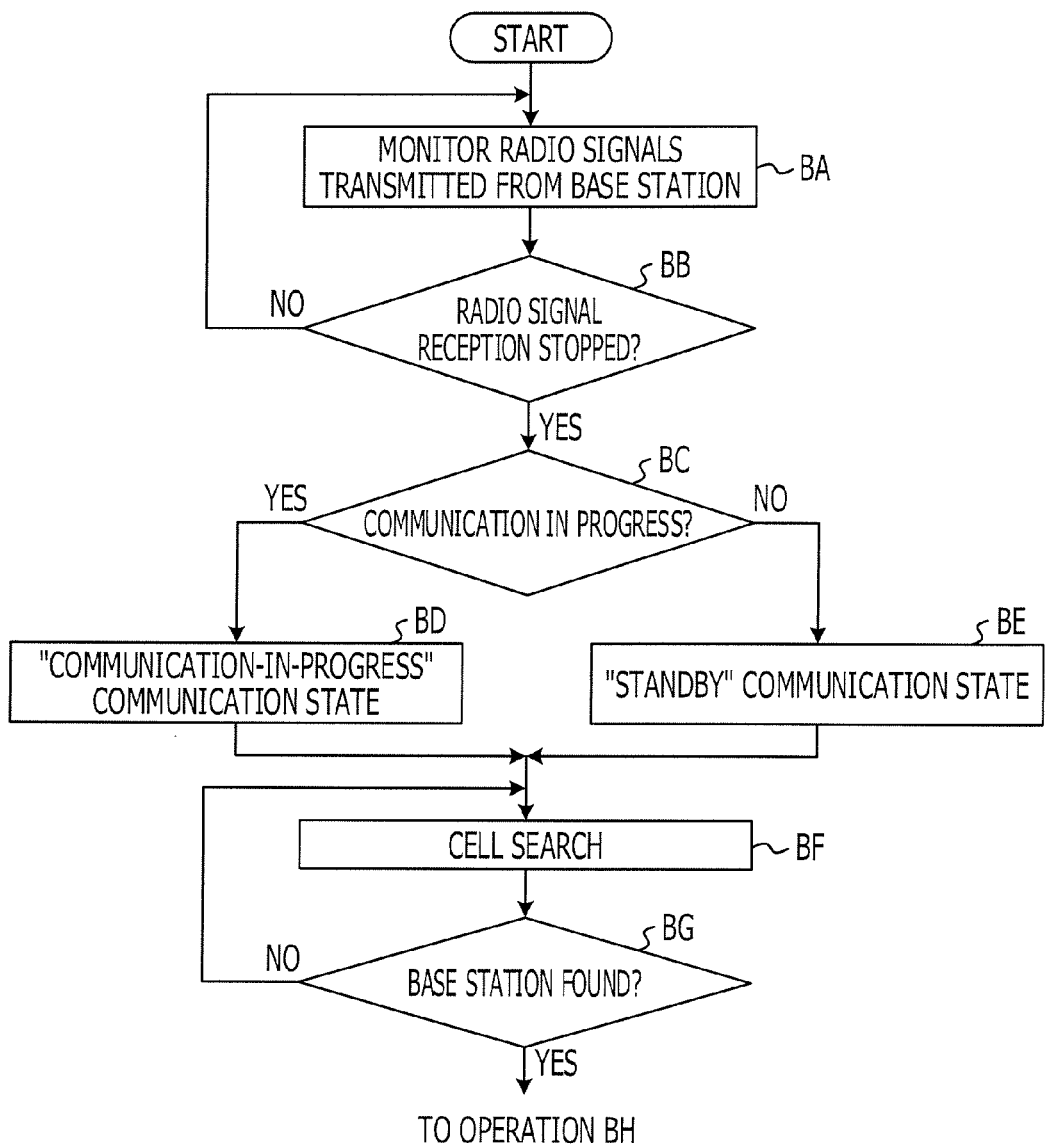
FIG. 12A is a flowchart illustrating a second example of an operation by the mobile station apparatus.
Figure 12B:
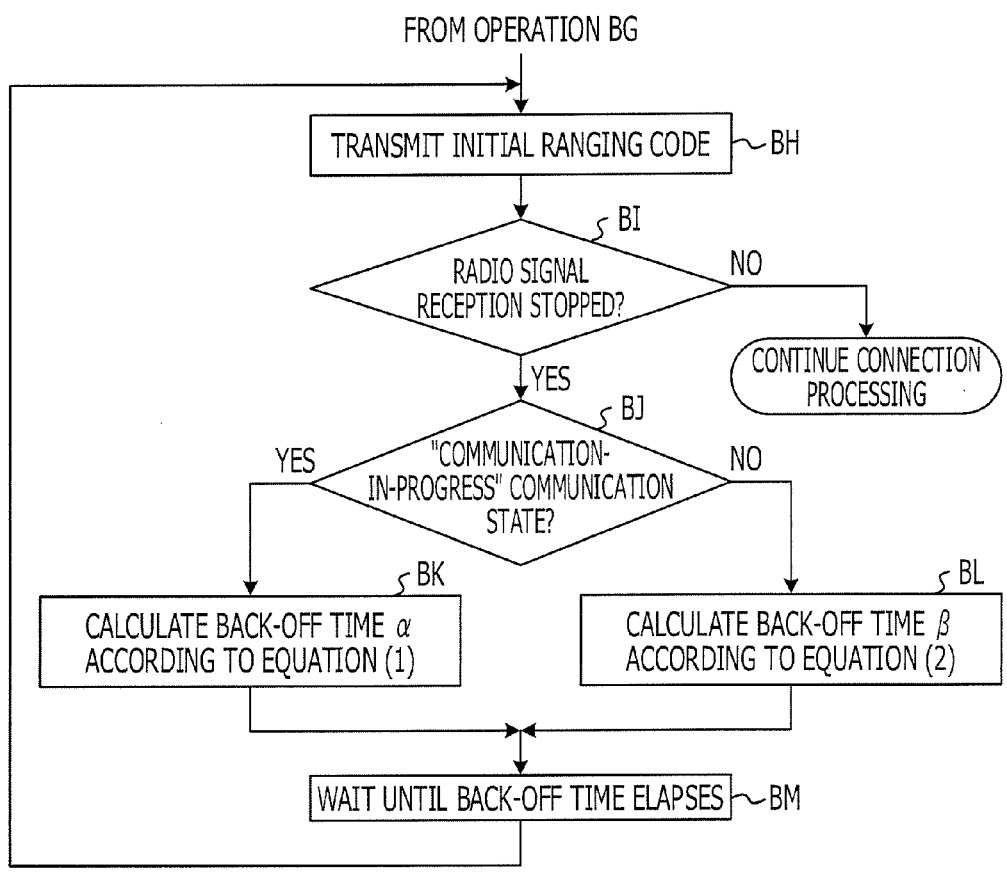
FIG. 12B is another flowchart illustrating the second example of an operation by the mobile station apparatus.

FIGS. 12A and 12B are each a flowchart illustrating a second example of an operation by the mobile station 3. Operations BA to BG are the same as operations AA to AG in FIG. 3A. In operation BH, the connection request transmitting unit 15 transmits an initial ranging code to the base station 2 that has been found in cell search.

In operation BI, the collision deciding unit 16 decides whether the initial ranging code transmitted to the base station 2 has caused a collision with an initial ranging code transmitted from another mobile station. If no initial ranging code collision has been caused (the result in operation BI is N), the connection processing is continued. If an initial ranging code collision has been caused (the result in operation BI is Y), the sequence proceeds to operation BJ.

In operation BJ, the back-off time calculating unit 17 decides whether the communication state of the mobile station 3 immediately before it has shifted to the out-of-coverage area was "communication-in-progress". If the communication state was the communication-in-progress communication state (the result in operation BJ is Y), the sequence proceeds to operation BK. If the communication state was not the communication-in-progress communication state (the result in operation BJ is N), the sequence proceeds to operation BL.

In operation BK, the back-off time calculating unit 17 calculates the back-off time α according to equation (1) above. The sequence then proceeds to operation BM. In operation BL, the back-off time calculating unit 17 calculates the back-off time β according to equation (2) above. The sequence then proceeds to operation BM. In operation BM, the back-off processing unit 18 waits until the back-off time calculated in one of operations BK and BL elapses. The sequence then returns to operation BH.

2.3 Advantageous Effects

In this embodiment, when the mobile station 3 has shifted to an out-of-coverage area, the communication state immediately before the mobile station 3 has shifted to the out-of-coverage area is stored. After that, the mobile station 3 moves a communication area covered by a base station 2 in some place and sends an initial ranging code. If the initial ranging code causes a collision, the stored communication state is referenced. The back-off time α and back-off time β, which are taken until an initial ranging code is retransmitted, are determined so that the back-off time β, which is taken when the communication state was "standby", is made longer than the back-off time α, which is taken when the communication state was "communication-in-progress". As a result, in restart of communication, the mobile station 3 that was communicating immediately before it has shifted to an out-of-coverage area takes precedence over the mobile station 3 that was on standby immediately before it has shifted to the out-of-coverage area. Furthermore, since retransmission times are decentralized, the probability of a collision during retransmission can be lowered and communication can be restarted in a short time.

3. Third Embodiment

Next, another embodiment of the mobile station 3 will be described. In this embodiment, the back-off time β, which is taken when the communication state of the mobile station 3 immediately before it has shifted to an out-of-coverage area was "standby", is calculated according to a cycle of an intermittent reception operation that the mobile station 3 performs while it is on standby.

When not communicating with the base station 2, the mobile station 3 performs an operation that is a so-called intermittent reception to reduce electric power consumption. In intermittent reception, while the base station 2 is in a period in which the base station 2 cyclically transmits a signal to call the mobile station 3, the mobile station 3 is turned on and receives the signal. In other periods, the mobile station 3 is turned off. A period during which the mobile station 3 intermittently receives the signal from the base station 2 is referred to as an intermittent reception period.

Figure 13:
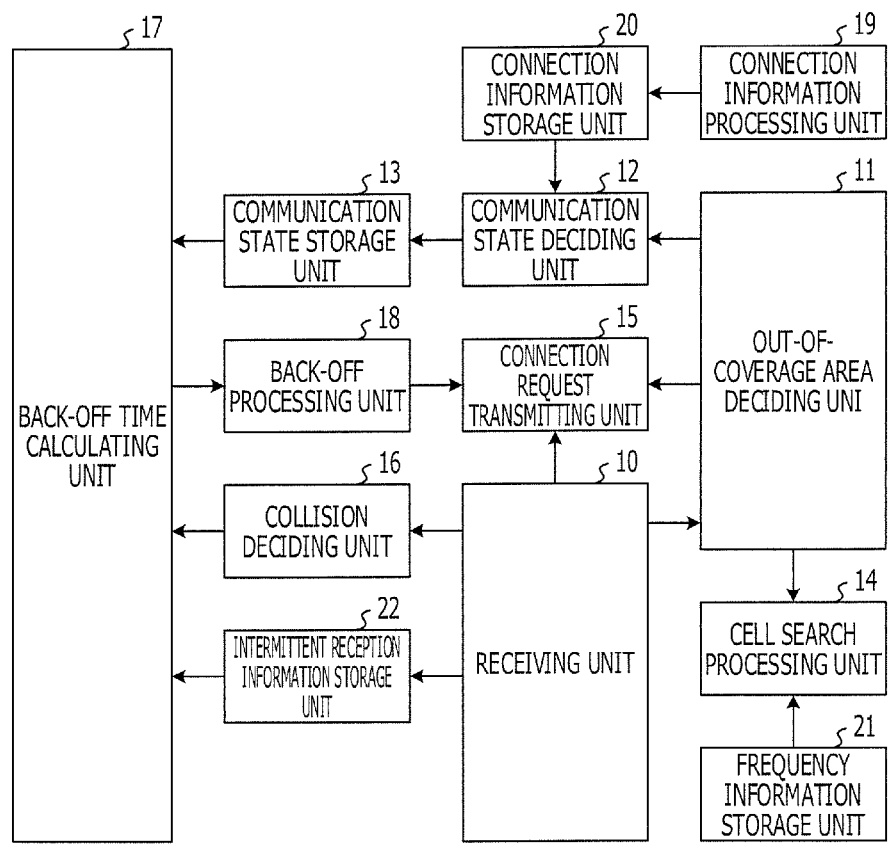
FIG. 13 illustrates the structure of a third embodiment of the mobile station apparatus.

FIG. 13 illustrates the structure of a third embodiment of the mobile station apparatus. Constituent elements that are the same as constituent elements in FIG. 4 will be given the same reference numerals as the reference numerals used in FIG. 4, and descriptions for the same functions will be omitted. The mobile station 3 includes an intermittent reception information storage unit 22.

The mobile station 3 receives a network deregistration command (DREG-CMD) message from the base station 2 before the mobile station 3 shifts to an out-of-coverage area and starts an intermittent reception operation. The receiving unit 10 decodes a communication signal received from the base station 2, obtains a DREG-CMD message, obtains a parameter used to control intermittent reception, and stores the parameter in the intermittent reception information storage unit 22.

FIG. 14 illustrates contents stored in the intermittent reception information storage unit 22. The cycle indicates the number of frames included in a period during which an intermittent reception period is cyclically repeated. The offset indicates the number of frames equivalent to a period starting from a frame having frame number 0 and continuing to a first frame in an intermittent reception period. The intermittent reception period indicates the number of frames included in an intermittent reception period. In this example, intermittent reception periods start from a frame with frame number 64, a frame with frame number 1064, a frame with frame number 2064, and so on. Five frames counted from the beginning of each intermittent reception period are specified as an intermittent reception period.

The back-off time calculating unit 17 reads out, from the communication state storage unit 13, the communication state of the mobile station 3 immediately before it has shifted to the out-of-coverage area. If the communication state was "standby", the back-off time calculating unit 17 uses an intermittent reception parameter to calculate the back-off time $\beta$. For example, the back-off time calculating unit 17 may calculate the back-off time $\beta$ according to equation (3) below.

$$\beta \text{ (milliseconds)} = (\text{integer from 1 to 99 that has been generated at random}) \times 10 + \text{length from current point until intermittent reception period starts} \quad (3)$$

Figure 15A:
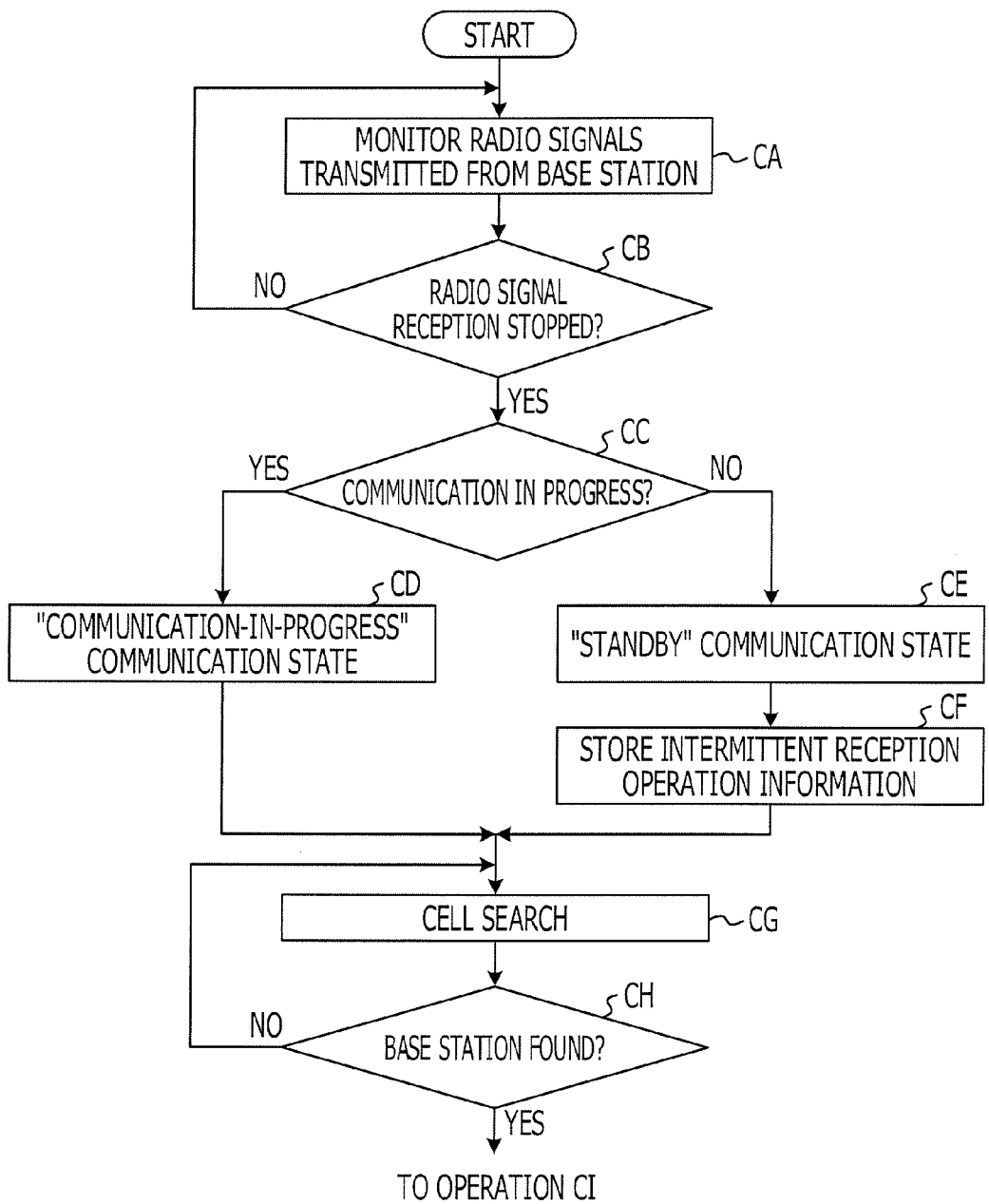
FIG. 15A is a flowchart illustrating a third example of an operation by the mobile station apparatus.
Figure 15B:
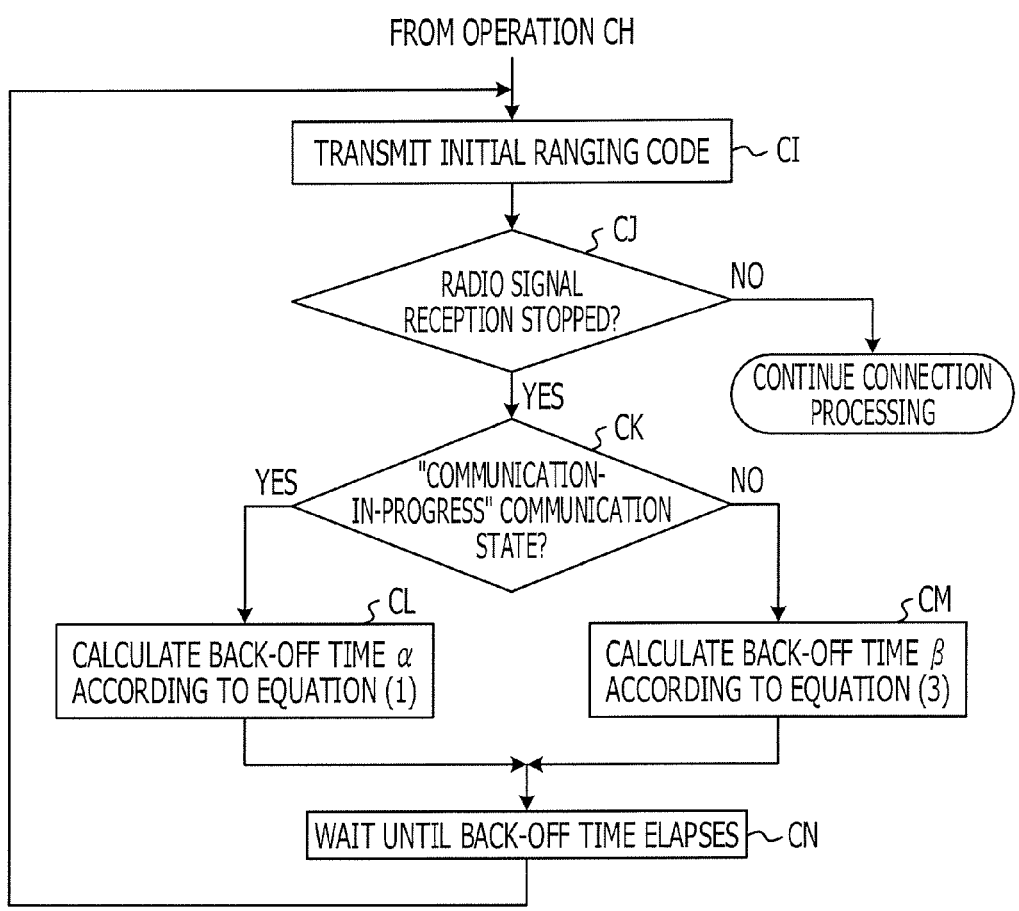
FIG. 15B is another flowchart illustrating the third example of an operation by the mobile station apparatus.

FIGS. 15A and 15B are each a flowchart illustrating a third example of an operation by the mobile station 3. Operations CA to CE are the same as operations BA to BE in FIG. 12A. In operation CF, the receiving unit 10 stores a parameter used to control intermittent reception in the intermittent reception information storage unit 22. Operations CG to CL are the same as operations BF to BK in FIGS. 12A and 12B.

In operation CM, the back-off time calculating unit 17 calculates the back-off time 13 according to equation (3) above. The sequence then proceeds to operation CN. In operation CN, the back-off processing unit 18 waits until the back-off time calculated in one of operations CL and CM elapses. The sequence then returns to operation CI.

In intermittent reception, the base station 2 may use different offsets in the intermittent reception cycle for different mobile stations 3 to decentralize loads. If the communication state of the mobile station 3 immediately before it has shifted to the out-of-coverage area was "standby", when the back-off time is calculated according to the intermittent reception cycle, the probability that a collision occurs during initial ranging code retransmission by the mobile station 3 that was in the standby communication state can be further reduced.

4. Fourth Embodiment

Next, another embodiment of the mobile station 3 will be described. With equation (3) above, the range of values that the back-off time $\beta$ can take and the range of values that the back-off time $\alpha$ can take may overlap depending on the integer generated at random and on the time to start the intermittent reception period. Therefore, it is sometimes not possible to give priority to the mobile station 3 that was in the communication-in-progress communication state in restarting communication.

The back-off time calculating unit 17 in this embodiment checks whether the back-off time $\beta$ calculated according to equation (3) above falls within the range of values calculated by the equation to calculate the back-off time $\alpha$. If the back-off time $\beta$ falls within the range of values calculated by the equation to calculate the back-off time $\alpha$, the back-off time $\beta$ is recalculated so that it does not fall within the range.

In the recalculation of the back-off time $\beta$, the back-off time calculating unit 17, for example, adds the intermittent reception cycle as in equation (4) below.

$$\beta \text{ (milliseconds)} = \beta + \text{intermittent reception cycle (represented in milliseconds)} \quad (4)$$

Figure 16A:
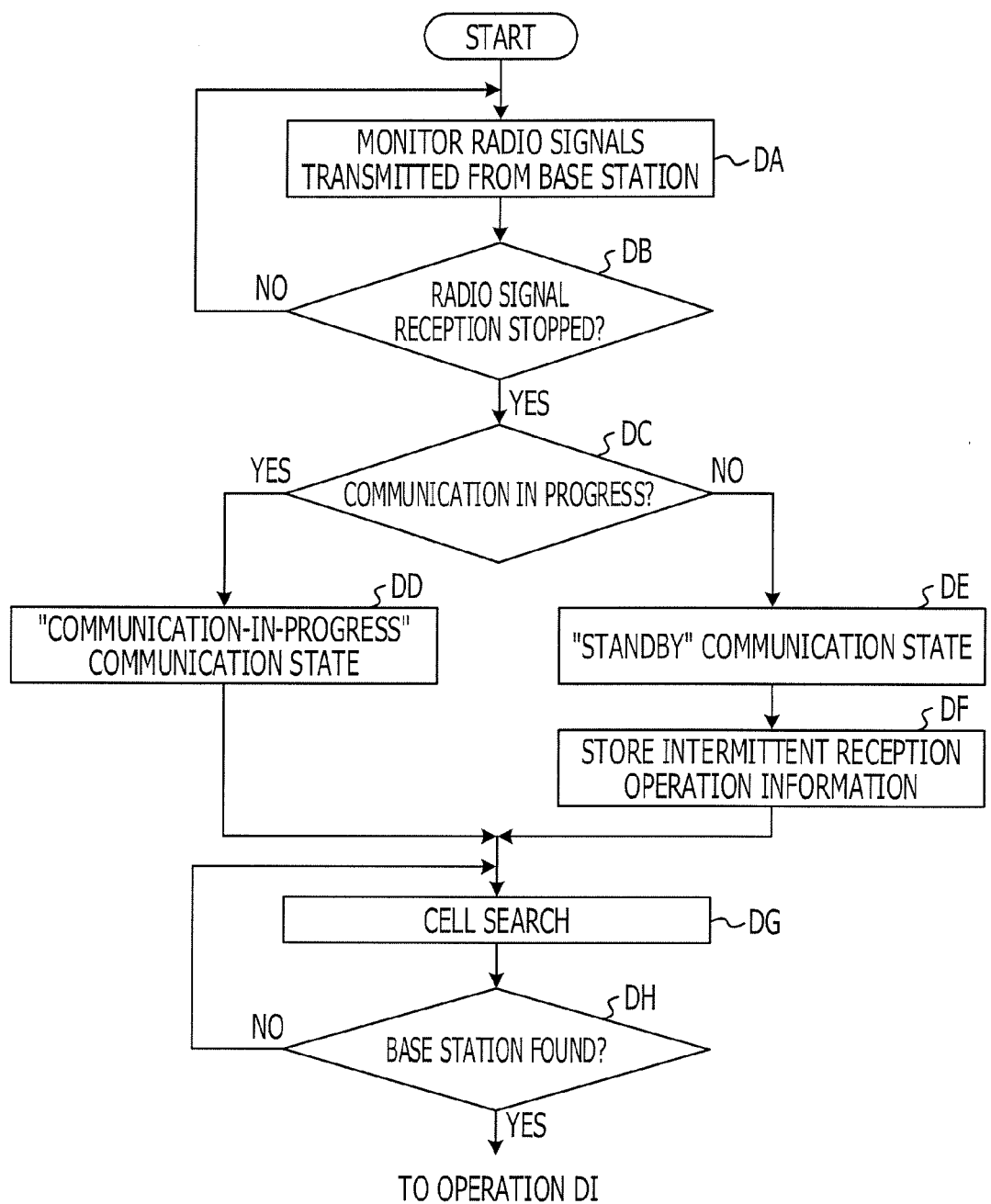
FIG. 16A is a flowchart illustrating a fourth example of an operation by the mobile station apparatus.

FIGS. 16A and 16B are each a flowchart illustrating a fourth example of an operation by the mobile station 3. Operations DA to DM are the same as operations CA to CM in FIGS. 15A and 15B. In operation DN, the back-off time calculating unit 17 checks whether the calculated back-off time $\beta$ falls within the range of values that the back-off time $\alpha$ can take. If the back-off time $\beta$ falls within the range of values that the back-off time $\alpha$ can take (the result in operation DN is Y), the sequence proceeds to operation DO. If the back-off time 13 does not fall within the range of values that the back-off time $\alpha$ can take (the result in operation DN is N), the sequence proceeds to operation DP.

In operation DO, the back-off time calculating unit 17 adds the intermittent reception cycle to the back-off time $\beta$. The sequence then returns to operation DN. In operation DP, the back-off processing unit 18 waits until one of the back-off time $\alpha$ calculated in operation DL and the back-off time $\beta$ calculated in operations DM to DO elapses. The sequence then returns to operation DI.

In this embodiment, the probability that a collision occurs during retransmission by the mobile station 3 that was in the standby communication state immediately before the mobile station 3 has shifted to an out-of-coverage area can be reduced and retransmission times can be decentralized by setting different retransmission times for the mobile station 3 that was in the communication-in-progress communication state and the mobile station 3 that was in the standby communication state.

5. Fifth Embodiment

Next, another embodiment of the mobile station 3 will be described. An application program that is operating in the mobile station 3 may try to transmit data in a period from when the mobile station 3 placed on standby shifts to an out-of-coverage area until the mobile station 3 retransmits an initial ranging code to the base station 2. When this happens in this embodiment, a back-off time is calculated as is done with the back-off time $\alpha$, which is taken when the communication state of the mobile station 3 immediately before it has shifted to an out-of-coverage area was "communication-in-progress".

Figure 17:
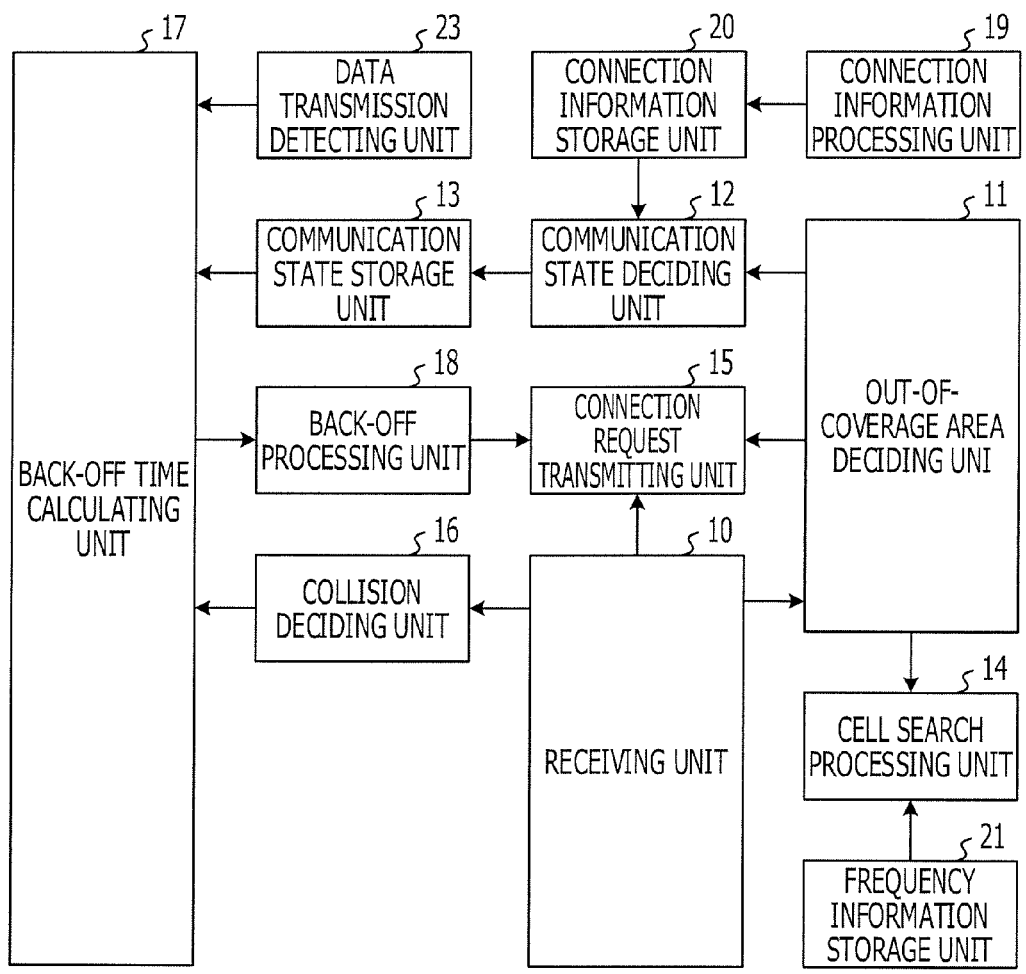
FIG. 17 illustrates the structure of a fourth embodiment of the mobile station apparatus.

FIG. 17 illustrates the structure of a fourth embodiment of the mobile station apparatus. Constituent elements that are the same as constituent elements in FIG. 4 will be given the same reference numerals as the reference numerals used in FIG. 4, and descriptions for the same functions will be omitted. The mobile station 3 includes a data transmission detecting unit 23.

After the out-of-coverage area deciding unit 11 has decided that the mobile station 3 had shifted to an out-of-coverage area, the data transmission detecting unit 23 receives data from the application program through an operating system (OS), indicating that the data transmission detecting unit 23 has detected data transmission.

If the communication state of the mobile station 3 immediately before it has shifted to the out-of-coverage area was "standby" and data transmission by the application program has been detected, the back-off time calculating unit 17 calculates a back-off time as is done with the back-off time $\alpha$, which is taken when the mobile station 3 was communicating immediately before the mobile station 3 has shifted to an out-of-coverage area.

Figure 18A:
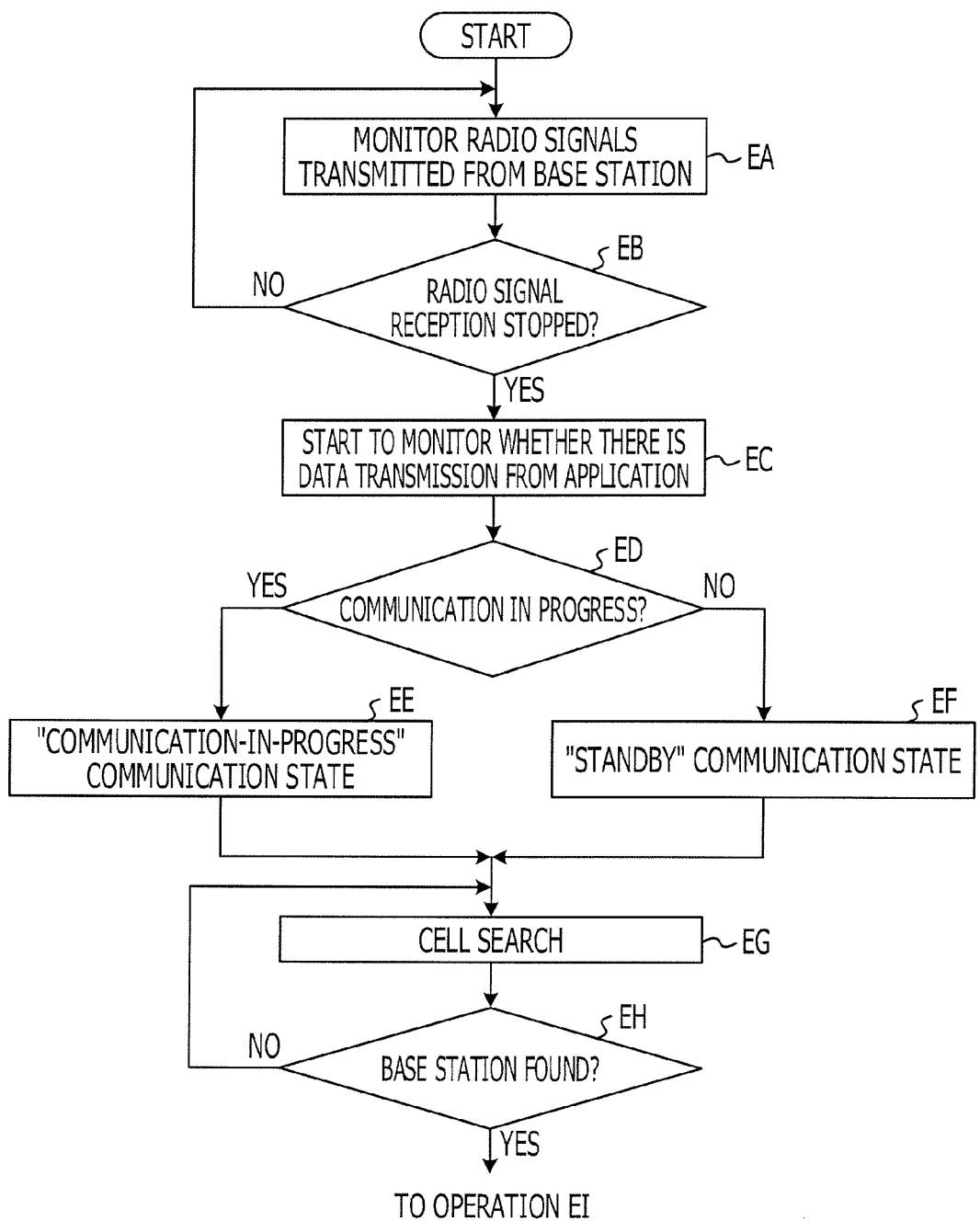
FIG. 18A is a flowchart illustrating a fifth example of an operation by the mobile station apparatus.

FIGS. 18A and 18B are each a flowchart illustrating a fifth example of an operation by the mobile station 3. Operations EA and EB are the same as operations BA and BB in FIG. 12A. If the out-of-coverage area deciding unit 11 decides that radio signal reception from the base station 2 has stopped (the result in operation EB is Y), in operation EC, the data transmission detecting unit 23 starts to monitor whether there is data transmission from the application program. Operations ED to EL are the same as operations BC to BK in FIGS. 12A and 12B.

If the communication state of the mobile station 3 immediately before it has shifted to the out-of-coverage area was "standby" (the result in operation EK is N), in operation EM, the data transmission detecting unit 23 decides whether data transmission has been detected after the data transmission detecting unit 23 had started to monitor data transmission by the application program. If data transmission has been detected (the result in operation EM is Y), the sequence proceeds to operation EL. If data transmission has not been detected (the result in operation EM is N), the sequence proceeds to operation EN.

In operation EL, the back-off time calculating unit 17 calculates a back-off time as is done with the back-off time $\alpha$, which is taken when the communication state of the mobile station 3 immediately before it has shifted to an out-of-coverage area was "communication-in-progress" (the result in operation EK is Y). The sequence then proceeds to operation EO. In operation EN, the back-off time calculating unit 17 calculates the back-off time $\beta$ so that it exceeds the range of values that the back-off time $\alpha$ can take. The sequence then proceeds to operation EO.

In operation EO, the back-off processing unit 18 waits until the back-off time calculated in one of operations EL and EN elapses. The sequence then returns to operation EI.

In this embodiment, if a mobile station 3 that is on standby shifts to an out-of-coverage area and tries to start communication in the out-of-coverage area, a back-off time is calculated as in the case of a mobile station 3 that has shifted to an out-of-coverage area during communication. As a result, it is possible for the mobile station 3 that tries to start communication in the out-of-coverage area to take precedence in starting communication over other mobile stations that are still on standby. In the above embodiments and other embodiments described below as well, when data transmission by an application program is detected, a back-off time taken when the communication state of the mobile station 3 immediately before it has shifted to an out-of-coverage area was "standby" may be calculated according to an equation that is used to calculate a back-off time taken when the communication state of the mobile station 3 immediately before it has shifted to an out-of-coverage area was "communication-in-progress".

6. Sixth Embodiment

Next, another embodiment of the mobile station 3 will be described. The mobile station 3 in this embodiment monitors the number of receptions of the RNG-RSP message transmitted from the base station 2 that has been found in cell search to other mobile stations from when a first initial ranging code is transmitted to the base station 2 until another initial ranging code is retransmitted due to a collision. The mobile station 3 calculates a back-off time according to the number of RNG-RSP message receptions.

Figure 19:
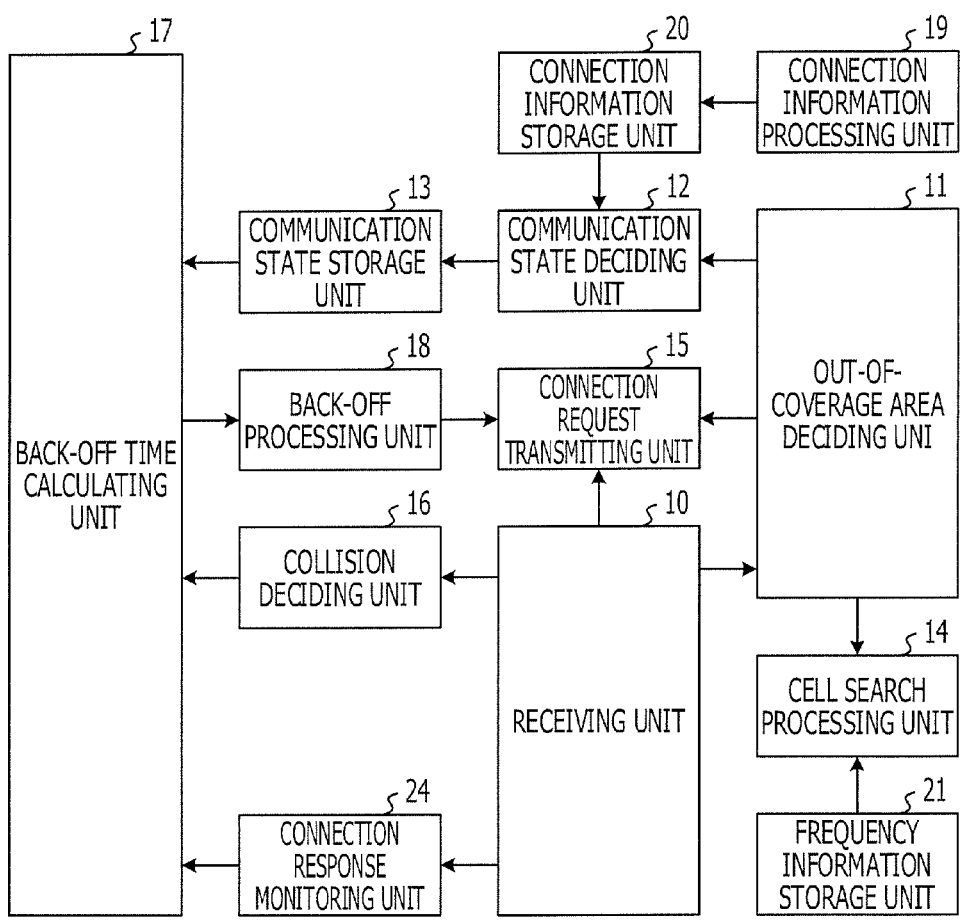
FIG. 19 illustrates the structure of a fifth embodiment of the mobile station apparatus.

FIG. 19 illustrates the structure of a fifth embodiment of the mobile station apparatus. Constituent elements that are the same as constituent elements in FIG. 4 will be given the same reference numerals as the reference numerals used in FIG. 4, and descriptions for the same functions will be omitted. The mobile station 3 includes a connection response monitoring unit 24.

After the connection request transmitting unit 15 has transmitted a first initial ranging code, the receiving unit 10 decodes a communication signal transmitted from the base station 2 and obtains an RNG-RSP message. The connection response monitoring unit 24 receives the RNG-RSP message from the receiving unit 10 and decides whether the destination of the message is the mobile station 3 or another mobile station.

The connection response monitoring unit 24 counts the number of receptions of messages destined for other mobile stations. FIG. 11 indicates the format of the RNG-RSP message.

The RNG-RSP message includes Ranging Code Attributes TLV as a type of TLV encoded information. Ranging Code Attributes TLV includes information indicated below.

Bits 22 to 32: Number of OFDMA symbols that were used in initial ranging code transmission Bits 16 to 21: Number of OFDMA sub-channels that were used in initial ranging code transmission Bits 8 to 15: Initial ranging code that was transmitted by a mobile terminal Bits 0 to 7: Lowe-order eight bits in a frame number used when the mobile terminal transmitted the initial ranging code If the value of Ranging Code Attributes TLV matches the condition at the time of transmission of the initial ranging code, the connection response monitoring unit 24 decides that the destination is the mobile station 3. If there is no match, the connection response monitoring unit 24 decides that the destination is another mobile station. The RNG-RSP message is transmitted through a channel shared by the mobile station 3 and other mobile stations. Accordingly, the mobile station 3 can also receive RNG-RSP messages destined for other mobile stations.

The back-off time calculating unit 17 calculates the back-off time $\alpha$, which is taken when the communication state of the mobile station 3 immediately before it has shifted to an out-of-coverage area was "communication-in-progress", according to the number of receptions of RNG-RSP messages destined for other mobile stations, the number of receptions being counted by connection response monitoring unit 24. For example, the back-off time calculating unit 17 may determine an upper limit of values that the random number can take as the number of receptions of RNG-RSP messages. The back-off time calculating unit 17 may calculate the back-off time $\alpha$ according to, for example, equation (5) below.

$$\alpha \text{ (milliseconds)} = \text{(integer generated at random within range of 1 to number of receptions of RNG-RSP messages destined for other mobile stations)} \times 10 \quad (5)$$

The back-off time calculating unit 17 also calculates the back-off time $\beta$ according to an equation that yields a value exceeding the range of values that the back-off time $\alpha$ can take. The back-off time calculating unit 17 may calculate the back-off time $\beta$ according to, for example, equation (6) below.

$$\beta \text{ (milliseconds)} = ((\text{integer generated at random within range of 1 to number of receptions of } RNG\text{-}RSP \text{ messages destined for other mobile stations}) + 100) \times 10 \quad (6)$$

Figure 21A:
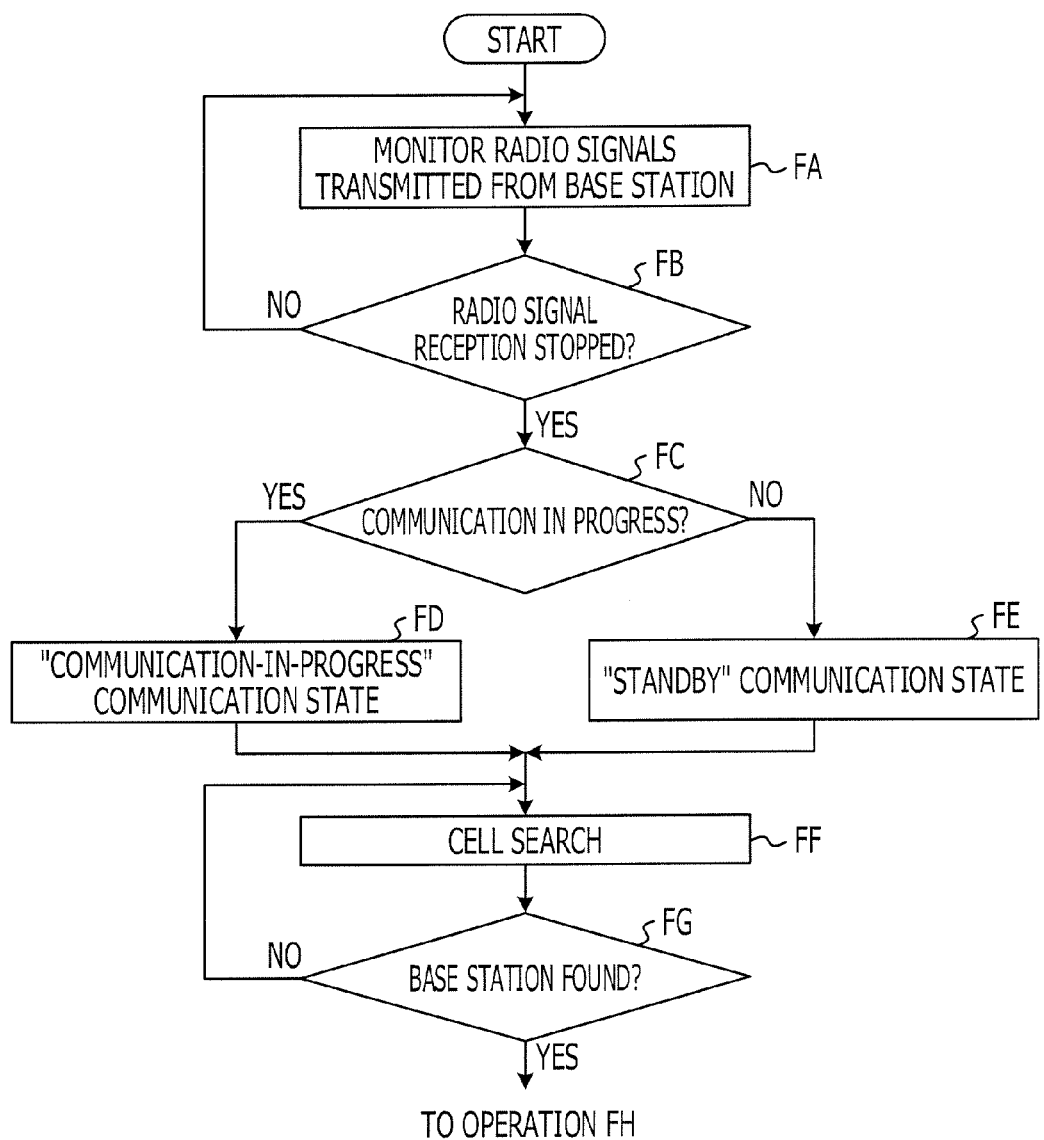
FIG. 21A is a flowchart illustrating a sixth example of an operation by the mobile station apparatus.
Figure 21B:
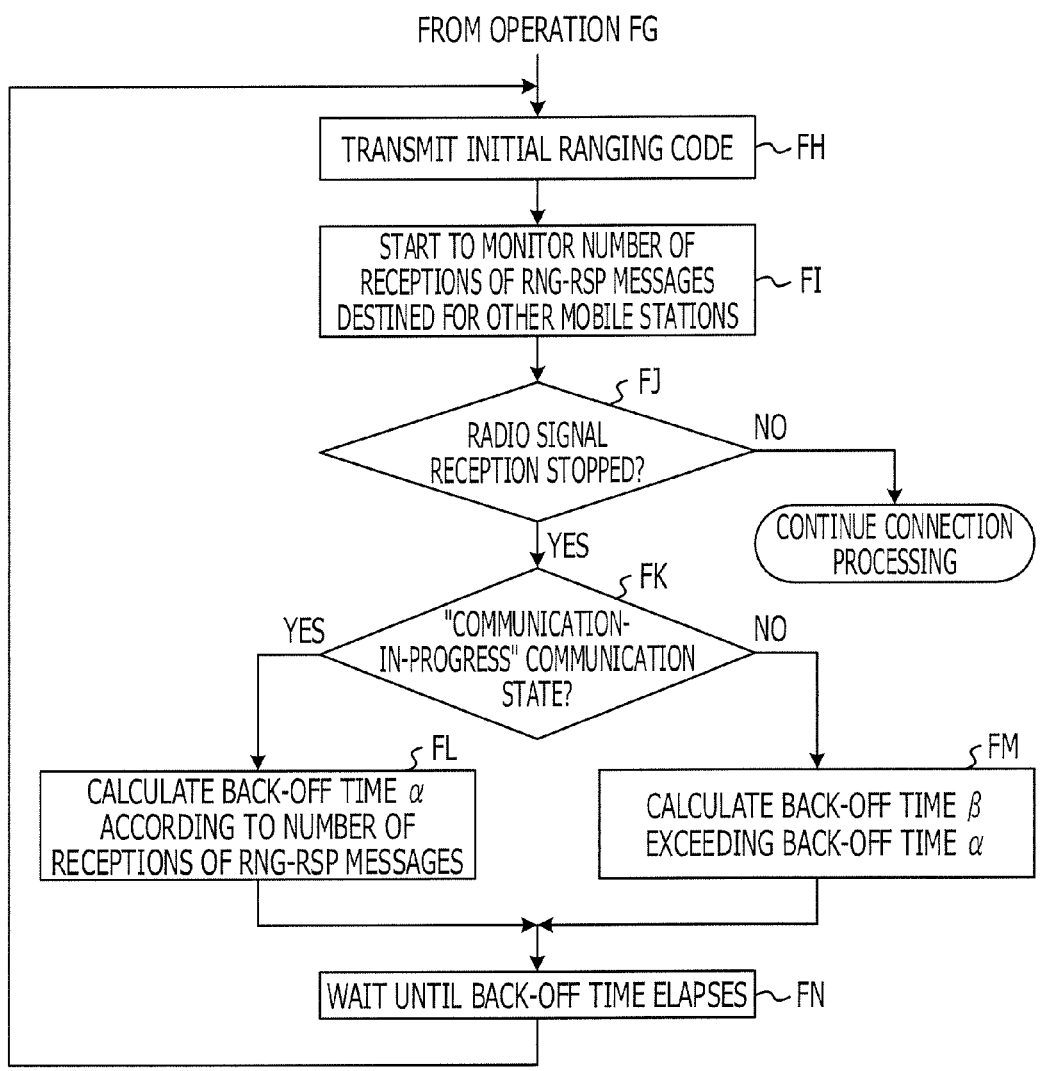
FIG. 21B is another flowchart illustrating the sixth example of an operation by the mobile station apparatus.

FIGS. 21A and 21B are each a flowchart illustrating a sixth example of an operation by the mobile station 3. Operations FA to FH are the same as operations BA to BH in FIGS. 12A and 12B. In operation FI, the connection response monitoring unit 24 starts to monitor the number of receptions of RNG-RSP messages destined for other mobile stations.

Operations FJ and FK are the same as operations BI and BJ in FIG. 12B. If the communication state of the mobile station 3 immediately before it has shifted to an out-of-coverage area was "communication-in-progress" (the result in operation FK is Y), the sequence proceeds to operation FL. If the communication state was not "communication-in-progress" (the result in operation FK is N), the sequence proceeds to operation FM.

In operation FL, the back-off time calculating unit 17 calculates the back-off time α according to the number of receptions of RNG-RSP messages destined for other mobile stations. The sequence then proceeds to operation FN. In operation FM, the back-off time calculating unit 17 calculates the back-off time β so that it exceeds the range of values that the back-off time α can take. The sequence then proceeds to operation FN. In operation FN, the back-off processing unit 18 waits until the back-off time calculated in one of operations FL and FM elapses. The sequence then returns to operation FH.

The number of receptions of RNG-RSP messages destined for other mobile stations is increased as the number of other mobile stations is increased. In this embodiment, the range of values that the back-off time can take can be increased as the number of other mobile stations is increased. As a result, retransmission times are decentralized, so the probability that a collision occurs during retransmission can be reduced, enabling communication to be restarted in a short time. In other embodiments described above as well, the back-off time may be calculated according to the number of RNG-RSP message receptions.

7. Hardware Structure

Figure 22:
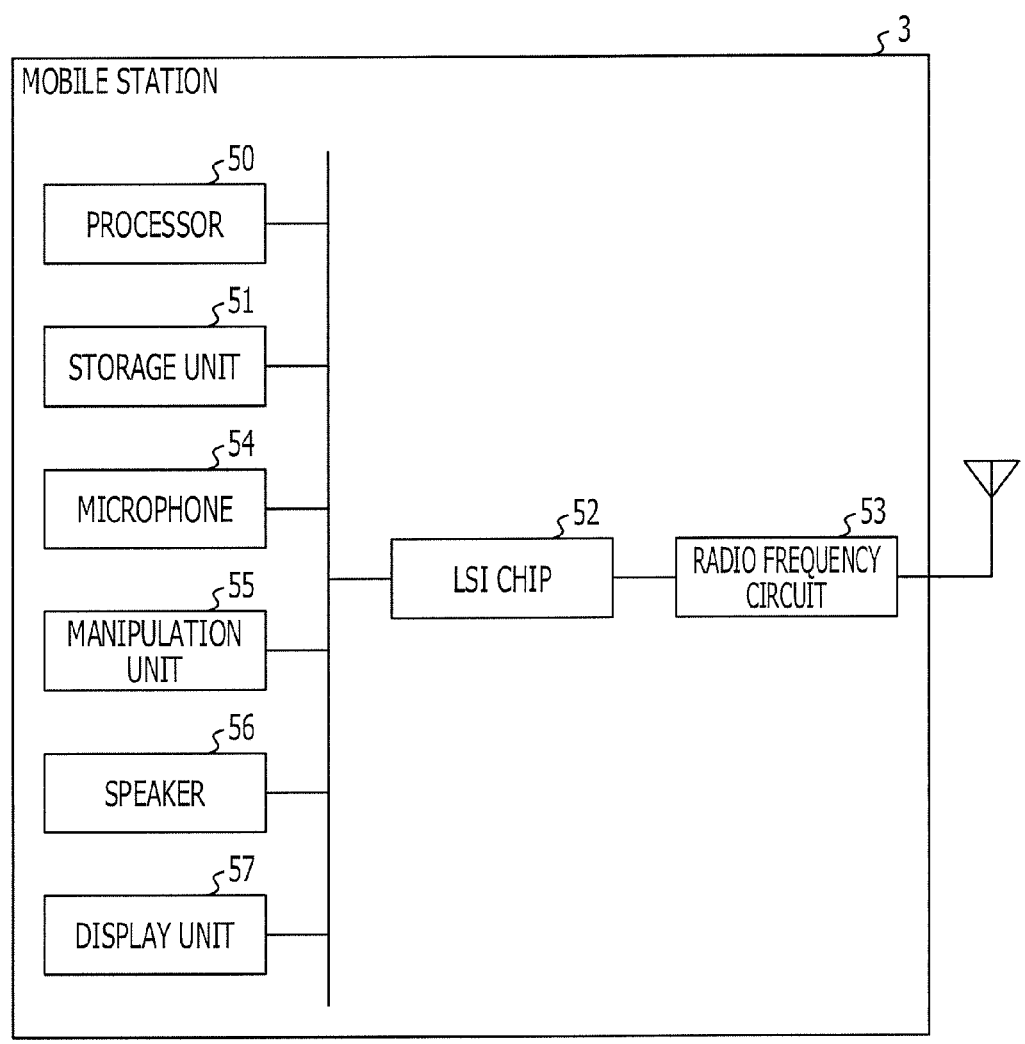
FIG. 22 is an example of the hardware structure of the mobile station apparatus.

Next, the hardware structure of the mobile station 3 will be described. FIG. 22 is an example of the hardware structure of the mobile station 3. The mobile station 3 includes a processor 50, a storage unit 51, a large scale integration (LSI) chip 52, and a radio frequency circuit 53. The mobile station 3 also has a microphone 54, a manipulation unit 55, a speaker 56, and a display unit 57. The radio frequency may be abbreviated as RF on the attached drawings and in the descriptions below.

The processor 50 executes a computer program stored in the storage unit 51 to execute information processing of application software used by the user of the mobile station 3 and to execute communication protocol processing for wireless communication with the base station 2. The storage unit 51 stores the computer program executed by the processor 50 and data used for the execution of the computer program. The storage unit 51 may include a non-volatile storage unit that stores programs and data and a random-access memory (RAM) that stores temporary data.

The LSI chip 52 executes base band signal processing on radio signals transmitted and received between the RF circuit 53 and the base station 2. The LSI chip 52 may include, for example, a field-programming gate array (FPGA), an application-specific integrated circuit (ASIC), and a digital signal processor (DSP). The RF circuit 53 performs analog-to-digital conversion on signals transmitted and received between the mobile station 3 and the base station 2, digital-to-analog conversion, frequency conversion, and amplification.

The operations, described above, by the receiving unit 10 and connection request transmitting unit 15 illustrated in FIG. 2 are implemented with the cooperation of the processor 50, LSI chip 52, and RF circuit 53. The operations, described above, by the out-of-coverage area deciding unit 11, communication state deciding unit 12, communication state storage unit 13, cell search processing unit 14, collision deciding unit 16, back-off time calculating unit 17, and back-off processing unit 18 are implemented by the processor 50.

The operation, described above, by the connection information processing unit 19 illustrated in FIG. 4 is implemented by the processor 50. Storage areas used as the connection information storage unit 20 and frequency information storage unit 21 are prepared in the storage unit 51. A storage area used as the intermittent reception information storage unit 22 illustrated in FIG. 13 is prepared in the storage unit 51. The operations, described above, by the data transmission detecting unit 23 illustrated in FIG. 17 and by the connection response monitoring unit 24 illustrated in FIG. 19 are implemented by the processor 50.

The hardware structure illustrated in FIG. 22 is only an example taken to describe an embodiment. The mobile station 3 described herein may use any other hardware structure if it executes the operations described above.

The functional block diagrams in FIGS. 2, 4, 13, 17, and 19 concentrate on structures related to the functions of the mobile station 3 described herein. The mobile station 3 may include constituent components other than the illustrated constituent components.

Each of a series of sequences described with reference to FIGS. 3A, 3B, 12A, 12B, 15A, 15B, 16A, 16B, 18A, 18B, 21A, and 21B may be interpreted as a method including a plurality of steps. In this case, the term "operation" may be read as referring to "step".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal comprising:
   a memory; and
   a processor coupled to the memory and configured to:
      transmit a first random access signal to a base station, when the terminal loses a synchronization with the base station;
      transmit a second random access signal to the base station after a period of time, when a response signal responsive to the first random access signal is not received from the base station;
      obtain a detection result by detecting, when the terminal loses the synchronization with the base station, whether the terminal is in an idle mode;
      set the period of time based on the detection result, the period of time being set to a first period when the detection result indicates the terminal is not in the idle mode, and the period of time being set to a second period longer than the first period when the detection result indicates the terminal is in the idle mode; and
      set the period of time to the first period when the detection result indicates the terminal is in the idle mode, but data to be transmitted by the terminal to the base station is also detected.

2. The terminal according to claim 1, wherein the period of time is the first period when the detection result indicates a communication is in progress, and the period of time is the second period when the detection result indicates the communication is not in progress.

3. The terminal according to claim 2, wherein the second period is set based on a rule that a maximum period for the first period is shorter than a minimum period for the second period.

4. The terminal according to claim 2, wherein the period of time is set in accordance with a specified timing of an intermittent reception, when the detection result indicates that a communication is not in progress.

5. The terminal according to claim 4, wherein the period of time is set to the specified timing after a maximum period for the first period.

6. The terminal according to claim 1, wherein the period of time is varied based on a number of times when a response signal is transmitted from the base station in response to a random access signal transmitted by another terminal.

7. The terminal according to claim 1, wherein the processor is further configured to obtain the detection result by detecting whether a communication is in progress in the terminal or the terminal is in the idle mode.

8. A communication circuit of a terminal, the communication circuit comprising:
   a memory; and
   a processor coupled to the memory and configured to:
      generate a first random access signal which is transmitted to a base station, when the terminal loses a synchronization with the base station;
      generate a second random access signal which is transmitted to the base station after a period of time, when a response signal responsive to the first random access signal is not received by the terminal;
      obtain a detection result by detecting, when the terminal loses the synchronization with the base station, whether the terminal is in an idle mode;
      set the period of time based on the detection result, the period of time being set to a first period when the detection result indicates the terminal is not in the idle mode, and the period of time being set to a second period longer than the first period when the detection result indicates the terminal is in the idle mode; and
      set the period of time to the first period when the detection result indicates the terminal is in the idle mode, but data to be transmitted by the terminal to the base station is also detected.

9. A communication method comprising:
   transmitting a first random access signal to a base station by a terminal, when the terminal loses a synchronization with the base station;
   transmitting a second random access signal to the base station after a period of time, when a response signal responsive to the first random access signal is not received by the terminal;
   obtaining a detection result by detecting, when the terminal loses the synchronization with the base station, whether the terminal is in an idle mode;
   setting the period of time based on the detection result, the period of time being set to a first period when the detection result indicates the terminal is not in the idle mode, and the period of time being set to a second period longer than the first period when the detection result indicates the terminal is in the idle mode; and
   setting the period of time to the first period when the detection result indicates the terminal is in the idle mode, but data to be transmitted by the terminal to the base station is also detected.

10. The communication method according to claim 9, wherein the period of time is the first period when the detection result indicates a communication is in progress, and the period of time is the second period when the detection result indicates the communication is not in progress.

11. The communication method according to claim 10, wherein the second period is set based on a rule that a maximum period for the first period is shorter than a minimum period for the second period.

12. The communication method according to claim 10, wherein the period of time is set in accordance with a specified timing of an intermittent reception, when the detection result indicates that the communication is not in progress.

13. The communication method according to claim 12, wherein the period of time is set to the specified timing after a maximum period for the first period.

14. The communication method according to claim 9, wherein the period of time is varied based on a number of times when a response signal is transmitted from the base station in response to a random access signal transmitted by another terminal.

* * * * *